(12) United States Patent
Sutherland et al.

(10) Patent No.: US 10,451,875 B2
(45) Date of Patent: Oct. 22, 2019

(54) SMART TRANSPARENCY FOR VIRTUAL OBJECTS

(71) Applicant: Microsoft Technology Licensing, LLC, Redmond, WA (US)

(72) Inventors: Jeff Sutherland, Sammamish, WA (US); Ben Sugden, Redmond, WA (US); Tom Salter, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 230 days.

(21) Appl. No.: 14/722,942

(22) Filed: May 27, 2015

(65) Prior Publication Data

US 2016/0025982 A1 Jan. 28, 2016

Related U.S. Application Data

(60) Provisional application No. 62/029,351, filed on Jul. 25, 2014.

(51) Int. Cl.
*G06F 3/01* (2006.01)
*G02B 27/00* (2006.01)
(Continued)

(52) U.S. Cl.
CPC ..... *G02B 27/0172* (2013.01); *G02B 27/0093* (2013.01); *G02B 27/017* (2013.01);
(Continued)

(58) Field of Classification Search
CPC .............. G02B 27/0172; G02B 27/017; G02B 2027/0174; G02B 2027/0178; G06F 3/011; G06F 3/04815
(Continued)

(56) References Cited

U.S. PATENT DOCUMENTS 5,748,189 A 5/1998 Trueblood
5,819,206 A 10/1998 Horton et al.
(Continued)

FOREIGN PATENT DOCUMENTS

CN 1922651 A 2/2007
CN 101162524 A 4/2008
(Continued)

OTHER PUBLICATIONS

"International Preliminary Report on Patentability Issued in PCT Application No. PCT/US2015/041868", dated Oct. 28, 2015, (10 Pages total).
(Continued)

*Primary Examiner* — Jade R Chwasz
(74) *Attorney, Agent, or Firm* — Mark K. Young; Mayer & Williams PC

(57) ABSTRACT

A head mounted display (HMD) device is configured with a sensor package that enables head tracking to determine the device user's proximity to virtual objects in a mixed reality or virtual reality environment. A fade volume including concentrically-arranged volumetric shells is placed around the user including a near shell that is closest to the user, and a far shell that is farthest from the user. When a virtual object is beyond the far shell, the HMD device renders the object with full opacity (i.e., with no transparency). As the user moves towards a virtual object and it intersects the far shell, its opacity begins to fade out with increasing transparency to reveal the background behind it. The transparency of the virtual object increases as the object gets closer to the near shell and the object becomes fully transparent when the near shell reaches it so that the background becomes fully visible.

16 Claims, 17 Drawing Sheets

(51) Int. Cl.
  *G02B 27/01* (2006.01)
  *G06F 3/0481* (2013.01)
(52) U.S. Cl.
  CPC .......... *G06F 3/011* (2013.01); *G06F 3/04815* (2013.01); *G02B 2027/0141* (2013.01); *G02B 2027/0174* (2013.01); *G02B 2027/0178* (2013.01)
(58) Field of Classification Search
  USPC .................. 359/13, 15, 9, 10, 11, 32, 35
  See application file for complete search history.

(56) References Cited

U.S. PATENT DOCUMENTS

| | | |
|---|---|---|
| 5,877,748 A | 3/1999 | Redlich |
| 6,012,926 A | 1/2000 | Hodges et al. |
| 6,023,275 A | 2/2000 | Horvitz |
| 6,329,986 B1 | 12/2001 | Cheng |
| 6,396,495 B1 | 5/2002 | Parghi et al. |
| 6,396,497 B1 | 5/2002 | Reichlen |
| 6,529,331 B2 | 3/2003 | Massof et al. |
| 6,552,698 B1 | 4/2003 | Walker |
| 6,741,241 B1 | 5/2004 | Jaubert et al. |
| 6,804,607 B1 | 10/2004 | Wood |
| 6,898,266 B2 | 5/2005 | Griffith |
| 7,274,380 B2 | 9/2007 | Navab et al. |
| 7,386,799 B1 | 6/2008 | Clanton et al. |
| 7,400,322 B1 | 7/2008 | Urbach |
| 7,486,817 B2 | 2/2009 | Yanagawa et al. |
| 7,538,775 B2 | 5/2009 | Ishihara |
| 7,542,210 B2 | 6/2009 | Chirieleison, Sr. |
| 7,557,774 B2 | 7/2009 | Baudisch et al. |
| 8,049,750 B2 | 11/2011 | Gloudemans et al. |
| 8,266,536 B2 | 9/2012 | Roberts et al. |
| 8,405,680 B1 | 3/2013 | Cardoso Lopes |
| 8,576,247 B2 | 11/2013 | Avkarogullari et al. |
| 8,611,015 B2 | 12/2013 | Wheeler et al. |
| 8,751,969 B2 | 6/2014 | Matsuda et al. |
| 8,754,931 B2 | 6/2014 | Gassel et al. |
| 8,780,014 B2 | 7/2014 | Border et al. |
| 8,793,620 B2 | 7/2014 | Stafford |
| 9,372,345 B2 | 6/2016 | Fujimaki |
| 9,443,352 B1 | 9/2016 | Glover |
| 9,645,397 B2 | 5/2017 | da Veiga et al. |
| 9,776,460 B2 | 10/2017 | Mita |
| 9,858,720 B2 | 1/2018 | da Veiga et al. |
| 9,865,089 B2 | 1/2018 | Burns et al. |
| 9,904,055 B2 | 2/2018 | Burns et al. |
| 2001/0035845 A1 | 11/2001 | Zwern |
| 2002/0044152 A1 | 4/2002 | Abbott et al. |
| 2002/0154214 A1 | 10/2002 | Scallie et al. |
| 2002/0181115 A1 | 12/2002 | Massof et al. |
| 2003/0091226 A1 | 5/2003 | Cahill |
| 2005/0024388 A1 | 2/2005 | Takemoto |
| 2005/0143887 A1 | 6/2005 | Kinoshita |
| 2005/0179703 A1 | 8/2005 | Johnson |
| 2006/0050070 A1 | 3/2006 | Matsui |
| 2006/0092178 A1 | 5/2006 | Tanguay, Jr. |
| 2006/0095207 A1 | 5/2006 | Reid |
| 2006/0241827 A1 | 10/2006 | Fukuchi |
| 2006/0284792 A1 | 12/2006 | Foxlin |
| 2007/0057946 A1 | 3/2007 | Albeck |
| 2007/0116326 A1 | 5/2007 | Aonuma et al. |
| 2007/0132662 A1 | 6/2007 | Morita |
| 2008/0174659 A1 | 7/2008 | McDowall |
| 2008/0195315 A1 | 8/2008 | Hu |
| 2008/0284864 A1 | 11/2008 | Kotake |
| 2009/0160985 A1 | 6/2009 | Javidi |
| 2009/0167785 A1 | 7/2009 | Wong |
| 2009/0189974 A1 | 7/2009 | Deering |
| 2009/0199275 A1 | 8/2009 | Brock et al. |
| 2009/0325699 A1 | 12/2009 | Delgiannidis |
| 2010/0208035 A1 | 8/2010 | Pinault |
| 2010/0208057 A1 | 8/2010 | Meier |
| 2010/0226017 A1 | 9/2010 | Spaller |
| 2010/0315413 A1 | 12/2010 | Izadi et al. |
| 2011/0029903 A1 | 2/2011 | Schooleman et al. |
| 2011/0043627 A1 | 2/2011 | Werling et al. |
| 2011/0140994 A1 | 6/2011 | Noma |
| 2011/0242090 A1* | 10/2011 | Keating ............... G06F 3/011 345/419 |
| 2012/0011445 A1 | 1/2012 | Gilboa |
| 2012/0052917 A1 | 3/2012 | Kim |
| 2012/0056876 A1 | 3/2012 | Lee et al. |
| 2012/0068913 A1 | 3/2012 | Bar-Zeev et al. |
| 2012/0092328 A1 | 4/2012 | Flaks |
| 2012/0113092 A1 | 5/2012 | Bar-Zeev et al. |
| 2012/0195471 A1 | 8/2012 | Newcombe |
| 2012/0237116 A1 | 9/2012 | Xiao |
| 2012/0249741 A1 | 10/2012 | Maciocci |
| 2012/0309522 A1 | 12/2012 | Westlund et al. |
| 2012/0313839 A1 | 12/2012 | Smithwick |
| 2012/0327116 A1 | 12/2012 | Liu et al. |
| 2013/0044128 A1 | 2/2013 | Liu et al. |
| 2013/0050258 A1 | 2/2013 | Liu et al. |
| 2013/0050432 A1 | 2/2013 | Perez et al. |
| 2013/0083007 A1 | 4/2013 | Geisner et al. |
| 2013/0083018 A1 | 4/2013 | Geisner |
| 2013/0088413 A1 | 4/2013 | Raffle et al. |
| 2013/0093789 A1 | 4/2013 | Liu et al. |
| 2013/0127860 A1 | 5/2013 | Hadap |
| 2013/0127980 A1 | 5/2013 | Haddick |
| 2013/0137076 A1 | 5/2013 | Perez et al. |
| 2013/0141419 A1 | 6/2013 | Mount et al. |
| 2013/0147686 A1 | 6/2013 | Clavin et al. |
| 2013/0194259 A1 | 8/2013 | Bennett et al. |
| 2013/0222589 A1 | 8/2013 | Lalonde et al. |
| 2013/0222647 A1 | 8/2013 | Ishihara |
| 2013/0257751 A1 | 10/2013 | Stafford |
| 2013/0257899 A1 | 10/2013 | Baron et al. |
| 2013/0287290 A1 | 10/2013 | Owechko |
| 2013/0300637 A1 | 11/2013 | Smits et al. |
| 2013/0307855 A1 | 11/2013 | Lamb et al. |
| 2013/0326364 A1 | 12/2013 | Latta et al. |
| 2013/0328927 A1 | 12/2013 | Mount et al. |
| 2013/0335301 A1 | 12/2013 | Wong |
| 2013/0335303 A1 | 12/2013 | Maciocci et al. |
| 2013/0336629 A1 | 12/2013 | Mulholland et al. |
| 2013/0342564 A1 | 12/2013 | Kinnebrew et al. |
| 2013/0342570 A1 | 12/2013 | Kinnebrew et al. |
| 2014/0002444 A1 | 1/2014 | Bennett et al. |
| 2014/0019874 A1 | 1/2014 | Li et al. |
| 2014/0049559 A1 | 2/2014 | Fleck et al. |
| 2014/0098009 A1 | 4/2014 | Prest |
| 2014/0104142 A1 | 4/2014 | Bickerstaff et al. |
| 2014/0125557 A1* | 5/2014 | Issayeva ............. G06F 3/04815 345/8 |
| 2014/0130041 A1 | 5/2014 | Luxenberg et al. |
| 2014/0132484 A1 | 5/2014 | Pandey et al. |
| 2014/0132715 A1 | 5/2014 | Raghoebardayal |
| 2014/0139639 A1 | 5/2014 | Wagner |
| 2014/0140579 A1 | 5/2014 | Takemoto |
| 2014/0145988 A1 | 5/2014 | Ishizawa |
| 2014/0168264 A1 | 6/2014 | Harrison |
| 2014/0176530 A1 | 6/2014 | Pathre |
| 2014/0184550 A1 | 7/2014 | Hennessey et al. |
| 2014/0204117 A1 | 7/2014 | Kinnebrew et al. |
| 2014/0221090 A1 | 8/2014 | Mutschler et al. |
| 2014/0240351 A1 | 8/2014 | Scavezze et al. |
| 2014/0253605 A1 | 9/2014 | Border et al. |
| 2014/0267400 A1 | 9/2014 | Mabbutt |
| 2014/0317555 A1 | 10/2014 | Choi et al. |
| 2014/0363073 A1 | 12/2014 | Shirakyan |
| 2014/0372957 A1 | 12/2014 | Keane et al. |
| 2015/0070274 A1 | 3/2015 | Morozov |
| 2015/0091780 A1 | 4/2015 | Lyren |
| 2015/0138081 A1 | 5/2015 | Iwatsu et al. |
| 2015/0138239 A1 | 5/2015 | Kim |
| 2015/0143459 A1 | 5/2015 | Molnar |
| 2015/0145887 A1 | 5/2015 | Forutanpour |
| 2015/0153833 A1 | 6/2015 | Pinault et al. |
| 2015/0178956 A1 | 6/2015 | Davis |
| 2015/0186016 A1 | 7/2015 | Li |

(56) References Cited

U.S. PATENT DOCUMENTS

| | | |
|---|---|---|
| 2015/0205106 A1 | 7/2015 | Norden |
| 2015/0243078 A1 | 8/2015 | Watson |
| 2015/0261293 A1 | 9/2015 | Wilairat |
| 2015/0325176 A1 | 11/2015 | Koyama |
| 2015/0355709 A1 | 12/2015 | Lee et al. |
| 2015/0355735 A1* | 12/2015 | Matsuda ............... G06F 3/0488 345/162 |
| 2015/0356788 A1 | 12/2015 | Abe |
| 2016/0011724 A1 | 1/2016 | Wheeler et al. |
| 2016/0025981 A1 | 1/2016 | Burns et al. |
| 2016/0026242 A1 | 1/2016 | Burns et al. |
| 2016/0027212 A1 | 1/2016 | Da veiga et al. |
| 2016/0027213 A1 | 1/2016 | Burns et al. |
| 2016/0027214 A1 | 1/2016 | Memmott et al. |
| 2016/0027215 A1 | 1/2016 | Burns et al. |
| 2016/0027216 A1 | 1/2016 | da veiga et al. |
| 2016/0027217 A1 | 1/2016 | da veiga et al. |
| 2016/0027218 A1 | 1/2016 | Salter et al. |
| 2016/0314622 A1 | 10/2016 | Davis et al. |
| 2018/0003982 A1 | 1/2018 | Burns et al. |
| 2018/0101994 A1 | 4/2018 | Da veiga et al. |

FOREIGN PATENT DOCUMENTS

| | | |
|---|---|---|
| CN | 101529899 A | 9/2009 |
| CN | 101813976 A | 8/2010 |
| CN | 102419631 A | 4/2012 |
| CN | 102473068 A | 5/2012 |
| CN | 102598677 A | 7/2012 |
| CN | 101540020 B | 9/2012 |
| CN | 102663722 A | 9/2012 |
| CN | 102918568 A | 2/2013 |
| CN | 102959616 A | 3/2013 |
| CN | 103064188 A | 4/2013 |
| CN | 103076875 A | 5/2013 |
| CN | 103091844 A | 5/2013 |
| CN | 103377476 A | 10/2013 |
| CN | 103460256 A | 12/2013 |
| CN | 103487937 A | 1/2014 |
| CN | 103493106 A | 1/2014 |
| CN | 103635849 A | 3/2014 |
| CN | 103761085 A | 4/2014 |
| CN | 106662924 A | 5/2017 |
| EP | 1521482 A2 | 4/2005 |
| EP | 2164045 A2 | 3/2010 |
| JP | 2013238693 A | 11/2013 |
| WO | 2009128781 A1 | 10/2009 |
| WO | 2013029097 A2 | 3/2013 |
| WO | 2013052855 A2 | 4/2013 |
| WO | 2013057649 A1 | 4/2013 |
| WO | 2013085193 A1 | 6/2013 |
| WO | 2013155217 A1 | 10/2013 |
| WO | 2014188798 A1 | 11/2014 |
| WO | 2015108887 A1 | 7/2015 |

OTHER PUBLICATIONS

"International Preliminary Report on Patentability Issued in PCT Application No. PCT/US2015/041864", dated Oct. 26, 2015, (11 Pages total).
"International Search Report and Written Opinion Issued in PCT Patent Application No. PCT/US2015/041861", dated Oct. 30, 2015, (11 pages total).
"International Search Report and Written Opinion Issued in PCT Application No. PCT/US2015/041867", dated Nov. 25, 2015, (11 Pages total).
"International Search Report & Written Opinion Received for PCT Application No. PCT/US2015/041863",dated Nov. 16, 2015, (12 Pages total).
"International Search Report & Written Opinion Issued in PCT Application No. PCT/US2015/041862", dated Nov. 16, 2015, (11 Pages total).
"International Search Report and Written Opinion Issued in PCT Application No. PCT/US2015/041865", dated Jan. 25, 2016, 12 Pages.
"International Search Report & Written Opinion Issued in PCT Patent Application No. PCT/US2015/041866", dated Nov. 27, 2015, 12 Pages.
"Second Written Opinion Issued in PCT Application No. PCT/US2015/041865", dated Jun. 15, 2016, 8 Pages.
"Second Written Opinion Issued in PCT Application No. PCT/US2015/041866", dated Jun. 27, 2016, 7 Pages.
Duchowski, Andrew, "Chapter 7—Head-Mounted System Software Development", In Book Eye Tracking Methodology, Theory and Practice, Part 2, Jan. 1, 2007, pp. 69-86. (18 pages total).
"Second Written Opinion Issued in PCT Application No. PCT/US2015/041868", dated Jul. 1, 2016, (6 Pages).
"Second Written Opinion Issued in PCT Application No. PCT/US2015/041862", dated Jun. 13, 2016, 5 Pages.
"Second Written Opinion Issued in PCT Application No. PCT/US2015/041863", dated Jun. 15, 2016, 7 Pages.
"Second Written Opinion Issued in PCT Application No. PCT/US2015/041861", dated Jun. 20, 2016, 6 Pages.
"International Preliminary Report on Patentability Issued in PCT Application No. PCT/US2015/041868", dated Oct. 13, 2016, 8 Pages.
"International Preliminary Report on Patentability Issued in PCT Application No. PCT/US2015/041863", dated Oct. 13, 2016, 8 Pages.
"International Preliminary Report on Patentability Issued in PCT Application No. PCT/US2015/041862", dated Oct. 13, 2016, 6 Pages.
"International Preliminary Report on Patentability Issued in PCT Application No. PCT/US2015/041861", dated Oct. 13, 2016, 7 Pages.
"International Preliminary Report on Patentability Issued in PCT Application No. PCT/US2015/041865", dated Oct. 19, 2016, 7 Pages.
"International Preliminary Report on Patentability Issued in PCT Application No. PCT/US2015/041866", dated Oct. 27, 2016, 9 Pages.
Nilsen, et al., "Tankwar—Tabletop War Gaming in Augmented Reality", In 2nd International Workshop on Pervasive Gaming Applications, PerGames. vol. 5, Retrieved on: Sep. 12, 2014, 5 pages.
Murray, et al., "Comparison of Head Gaze and Head and Eye Gaze within an Immersive Environment", In Tenth IEEE International Symposium on Distributed Simulation and Real-Time Applications, Oct. 2, 2006, 7 pages.
Steptoe, et al., "Eye Tracking for Avatar Eye Gaze Control during Object-Focused Multiparty Interaction in Immersive Collaborative Virtual Environments", In IEEE Virtual Reality Conference, Mar. 14, 2009, 8 pages.
Suma, et al., "Sharing Space in Mixed and Virtual Reality Environments Using a Low-Cost Depth Sensor", In Proceedings of IEEE International Symposium on Virtual Innovation, Mar. 19, 2011, 2 pages.
Ponto, et al., "Perceptual Calibration for Immersive Display Environments", In IEEE Transactions on Visualization and Computer Graphics, vol. 19, Issue 4, Apr. 2013, pp. 691-700, 10 pages.
Li, et al., "On the Anisotropy of Perceived Ground Extents and the Interpretation of Walked Distance as a Measure of Perception", In Journal of Experimental Psychology: Human Perception and Performance, vol. 39, Issue 2, Apr. 2013, 33 pages.
Li, et al., "The Underestimation of Egocentric Distance: Evidence from Frontal Matching Tasks", In Proceedings of Attention, Perception & Psychophysics, Oct. 2011, 15 pages.
Howe, Bo, "Holographic Computer Monitor", Published on: Aug. 18, 2010, Available at: www.youtube.com/watch?v=tHlxj7fY-38, 2 pages.
Angley, Natalie, "Glasses to make you a real-life Tony Stark", Published on: Oct. 31, 2013, Available at: http://edition.cnn.com/2013/10/31/tech/innovation/meta-augmented-reality-glasses/, 4 pages.
Hiner, Jason, "Future iPhone concept: Laser keyboard and holographic display", Published on: Aug. 31, 2011, Available at: http://

(56) References Cited

OTHER PUBLICATIONS www.techrepublic.com/blog/tech-sanity-check/future-iphone-concept-laser-keyboard-and-holographic-display/, 6 pages.

Chen, Jian, "A Virtual Environment System for the Comparative Study of Dome and HMD", In Master Thesis, Department of Computer Science, University of Houston, May 2002, 104 pages.

McCarthy, Mike, "HP intros new versions of its mobile and tower workstations", Retrieved on: Sep. 11, 2014, Available at: http://postperspective.com/hp-intros-new-versions-pro-offerings/, 5 pages.

Nakashima, et al., "A 2D-3D Integrated Environment for Cooperative Work", In Proceedings of the Virtual Reality Software and Technology, Nov. 7, 2005, 7 pages.

Pierce, et al., "Image Plane Interaction Techniques in 3D Immersive Environments", In Proceedings of the symposium on Interactive 3D graphics, Apr. 30, 1997, 10 pages.

Regenbrecht, et al., "Interaction in a Collaborative Augmented Reality Environment", In Proceedings of CHI Extended Abstracts on Human Factors in Computing Systems, Apr. 20, 2002, 2 pages.

"Touchscreen interface for seamless data transfer between the real and virtual worlds", Published on: Apr. 15, 2013, Available at: http://www.diginfo.tv/v/13-0025-r-en.php, 8 pages.

Urban, John, "Five Free Tools for Multi-Monitor Computer Set-Ups", Published on: Sep. 16, 2009, Available at: http://sixrevisions.com/tools/five-free-tools-for-multi-monitor-computer-set-ups/, 17 pages.

Steinicke, et al., "Natural Perspective Projections for Head-Mounted Displays", In IEEE Transactions on Visualization and Computer Graphics, Jul. 2011, 12 pages.

Hogue, David, "What Are Index and Alpha Transparency?", Published on: Mar. 3, 2011, Available at: http://www.idux.com/2011/02/27/what-are-index-and-alpha-transparency/, 14 pages.

Jimenez, et al., "Gaze-based Interaction for Virtual Environments", In Journal of Universal Computer Science, vol. 14, Issue 19, Nov. 2008, 14 pages.

Kinoshita, et al., "A Fast and Robust 3D Head Pose and Gaze Estimation System", In 8th IEEE International Conference on Automatic Face & Gesture Recognition, Sep. 17, 2008, 2 pages.

Peterson, et al., "Evaluation of Alternative Label Placement Techniques in Dynamic Virtual Environments", In Proceedings of the 10th International Symposium on Smart Graphics, May 22, 2009, 7 pages.

Kuhl, et al., "HMD Calibration and its Effects on Distance Judgments", In Proceedings of the 5th symposium on Applied perception in graphics and Visualization, Aug. 9, 2008, 24 pages.

Kim. et al., "3D Reconstruction of Stereo Images for Interaction between Real and Virtual Worlds", In Proceedings of the Second IEEE and ACM International Symposium on Mixed and Augmented Reality, Oct. 7, 2003, 9 pages.

Amar, et al., "Synthesizing Reality for Realistic Physical Behavior of Virtual Objects in Augmented Reality Applications for Smart-Phones", In Proceedings of IEEE Virtual Reality, Mar. 16, 2013, pp. 123-124, 2 pages.

Lavoie, et al., "Constructing 3D Virtual Reality Objects from 2D Images of Real Objects Using NURBS", In Proceedings of IEEE International Conference on Virtual Environments, Human-Computer Interfaces, and Measurement Systems Ostuni, Jun. 25, 2007, 8 pages.

Nóbrega, et al., "Magnetic Augmented Reality: Virtual Objects in Your Space", In Proceedings of the International Working Conference on Advanced Visual Interfaces, May 21, 2012, pp. 332-335, 4 pages.

Izadi, et al., "KinectFusion: Real-time 3D Reconstruction and Interaction Using a Moving Depth Camera", In Proceedings of the 24th annual ACM symposium on User interface software and technology, Oct. 16, 2011, 10 pages.

Kalkofen, et al., "Visualization Techniques for Augmented Reality", In Proceedings of Handbook of Augmented Reality, Jul. 13, 2011, pp. 65-98, 34 pages.

Maimone, et al., "Computational Augmented Reality Eyeglasses", In Proceedings of IEEE International Symposium on Mixed and Augmented Reality, Oct. 1, 2013, 10 pages.

"Virtual Reality (VR) and Mixed Reality (MR) technologies", Retrieved on: Sep. 12, 2014, Available at: http://www.vr-hyperspace.eu/about-vr-hyperspace/technology/77-virtual-reality-vr-and-mixed-reality-mr-technologies (5 pages total).

"Gaze Awareness for Videoconferencing: A Software Approach" (by Jim Gemmell and Kentaro Toyama, Microsoft; C. Lawrence Zitnick and Thomas Kang, Carnegie Mellon University; Steven Seitz, University of Washington, in 1070-986X/00/$10.00 © 2000 IEEE) (10 pages total).

"Non-Final Office Action Issued in U.S. Appl. No. 15/679,997", dated Oct. 19, 2017, 24 pages.

"Final Office Action Issued in U.S. Appl. No. 14/723,065", dated Dec. 21, 2017, 42 Pages.

"Non Final Office Action Issued in U.S. Appl. No. 15/841,047", dated Jan. 25, 2018, 85 Pages.

"Non Final Office Action issued in U.S. Appl. No. 14/628,539", dated Jun. 27, 2018, 29 Pages.

"Final Office Action Issued in U.S. Appl. No. 14/697,109", dated May 17, 2018, 23 Pages.

"Non Final Office Action Issued in U.S. Appl. No. 14/600,774", dated May 17, 2018, 35 Pages.

"Final Office Action Issued in U.S. Appl. No. 14/723,065", dated May 2, 2018, 41 Pages.

"Non Final Office Action Issued in U.S. Appl. No. 15/679,997", dated Dec. 13, 2018, 15 Pages.

"Office Action Issued in Chinese Patent Application No. 201580041151.4", dated Dec. 21, 2018, 29 Pages.

"Office Action Issued in Chinese Patent Application No. 201580041403.3", dated Dec. 21, 2018, 18 Pages.

"Final Office Action Issued in U.S. Appl. No. 14/600,774", dated Oct. 13, 2017, 36 Pages.

"Final Office Action Issued in U.S. Appl. No. 14/600,774", dated Oct. 5, 2018, 32 Pages.

"Non Final Office Action Issued in U.S. Appl. No. 14/600,774", dated Mar. 24, 2017, 29 Pages.

"Non Final Office Action Issued in U.S. Appl. No. 14/611,447", dated Dec. 27, 2016, 20 Pages.

"Final Office Action Issued in U.S. Appl. No. 14/612,850", dated Jan. 12, 2017, 15 Pages.

"Non Final Office Action Issued in U.S. Appl. No. 14/612,850", dated Jun. 26, 2017, 15 Pages.

"Non Final Office Action Issued in U.S. Appl. No. 14/612,850", dated Jun. 23, 2016, 17 Pages.

"Final Office Action Issued in U.S. Appl. No. 14/628,539", dated Apr. 7, 2017, 20 Pages.

"Final Office Action Issued in U.S. Appl. No. 14/628,539", dated Jan. 22, 2018, 29 Pages.

"Non-final Office Action Issued in U.S. Appl. No. 14/628,539", dated Sep. 14, 2017, 24 Pages.

"Non-final Office Action Issued in U.S. Appl. No. 14/628,539", dated Nov. 17, 2016, 17 Pages.

"Final Office Action Issued in U.S. Appl. No. 14/688,695", dated Nov. 4, 2016, 21 Pages.

"Non Final Office Action Issued in U.S. Appl. No. 14/688,695", dated Mar. 20, 2017, 24 Pages.

"Non Final Office Action Issued in U.S. Appl. No. 14/688,695", dated Jul. 12, 2016, 20 Pages.

"Notice of Allowance Issued in U.S. Appl. No. 14/688,695", dated Aug. 29, 2017, 12 Pages.

"Final Office Action Issued in U.S. Appl. No. 14/688,817", dated Dec. 22, 2016, 56 Pages.

"Non Final Office Action Issued in U.S. Appl. No. 14/688,817", dated Mar. 23, 2017, 57 Pages.

"Non Final Office Action Issued in U.S. Appl. No. 14/688,817", dated Aug. 4, 2016, 50 Pages.

"Final Office Action Issued in U.S. Appl. No. 14/697,109", dated Jun. 16, 2017, 19 Pages.

"Non Final Office Action Issued in U.S. Appl. No. 14/697,109", dated Oct. 4, 2017, 17 Pages.

"Non Final Office Action Issued in U.S. Appl. No. 14/697,109", dated Jan. 3, 2017, 19 Pages.

"Non Final Office Action Issued in U.S. Appl. No. 14/697,227", dated Aug. 12, 2016, 17 Pages.

(56) References Cited

OTHER PUBLICATIONS

"Final Office Action Issued in U.S. Appl. No. 14/723,065", dated Feb. 7, 2017, 37 Pages.
"Non Final Office Action Issued in U.S. Appl. No. 14/723,065", dated Sep. 26, 2016, 29 Pages.
"Non Final Office Action Issued in U.S. Appl. No. 14/723,065", dated Jul. 24, 2017, 38 Pages.
"Final Office Action Issued in U.S. Appl. No. 15/679,997", dated Apr. 5, 2018, 17 Pages.
"Office Action Issued in Chinese Patent Application No. 201580041327.6", dated Dec. 5, 2018, 20 Pages.
"Office Action Issued in Chinese Patent Application No. 201580041345.4", dated Dec. 5, 2018, 19 Pages.
"Office Action Issued in Chinese Patent Application No. 201580041348.8", dated Nov. 30, 2018, 15 Pages.
"Office Action Issued in Chinese Patent Application No. 201580041349.2", dated Dec. 5, 2018, 19 Pages.
"Office Action Issued in Chinese Patent Application No. 201580041369.X", dated Dec. 6, 2018, 10 Pages.
"Office Action Issued in Colombian Patent Application No. NC2017/0000546", dated Apr. 13, 2018, 14 Pages. (w/o English Translation).
"Office Action Issued in Colombian Patent Application No. NC2017/0000546", dated Sep. 14, 2018, 3 Pages.
"Office Action Issued in Colombian Patent Application No. NC2017/0000546", dated Jan. 25, 2017, 2 Pages. (w/o English Translation).
"Office Action Issued in European Patent Application No. 15748368.6", dated Feb. 15, 2019, 5 Pages.
"First Office Action and Search Report Issued in Chinese Patent Application No. 201580041217.X", dated Feb. 28, 2019, 22 Pages.
"Office Action Issued in European Patent Application No. 15748367.8", dated Apr. 8, 2019, 6 Pages.
"Office Action Issued in European Patent Application No. 15748369.4", dated Apr. 11, 2019, 5 Pages.
"Office Action Issued in European Patent Application No. 15763668.9", dated Apr. 9, 2019, 5 Pages.
"Final Office Action Issued in U.S. Appl. No. 15/679,997", dated Jun. 26, 2019, 15 Pages.
"Second Office Action Issued in Chinese Patent Application No. 201580041327.6", dated Jun. 11, 2019, 7 Pages.
"Second Office Action Issued in Chinese Patent Application No. 201580041345.4", dated Jun. 11, 2019, 7 Pages.
"Second Office Action Issued in Chinese Patent Application No. 201580041349.2", dated Jul. 8, 2019, 7 Pages.
"Second Office Action Issued in Chinese Patent Application No. 201580041403.3", dated Jul. 8, 2019, 17 Pages.
"Second Office Action Issued in Chinese Patent Application No. 201580041348.8", dated Jul. 8, 2019, 7 Pages.
"Office Action Issued in European Patent Application No. 15745719.3", dated Jul. 24, 2019, 5 Pages.
"Third Office Action Issued in Chinese Patent Application No. 201580041345.4", dated Sep. 2, 2019, 7 Pages.
"Third Office Action Issued in Chinese Patent Application No. 201580041327.6", dated Aug. 23, 2019, 6 Pages.
"Office Action Issued in European Patent Application No. 15763668.9", dated Aug. 29, 2019, 4 Pages.
"Office Action Issued in European Patent No. 15748367.8", dated Aug. 29, 2019, 4 Pages.

* cited by examiner

Beyond the far shell

Upon intersection with the near shell

SMART TRANSPARENCY FOR VIRTUAL OBJECTS

STATEMENT OF RELATED APPLICATIONS

This application claims benefit and priority to U.S. Provisional Application Ser. No. 62/029,351 filed Jul. 25, 2014, entitled "Head Mounted Display Experiences" which is incorporated herein by reference in its entirety.

BACKGROUND

Mixed reality and virtual reality computing devices, such as head mounted display (HMD) systems and handheld mobile devices (e.g. smart phones, tablet computers, etc.), may be configured to display information to a user about virtual and/or real objects in the field of view of the user and/or a field of view of a camera of the device. For example, an HMD device may be configured to display—using a see-through display system or an opaque display system with camera pass-through or other outward sensor—virtual environments with real world objects mixed in, real world environments with virtual objects mixed in, or pure virtual worlds. Similarly, a mobile device may display such information using a camera viewfinder window.

This Background is provided to introduce a brief context for the Summary and Detailed Description that follow. This Background is not intended to be an aid in determining the scope of the claimed subject matter nor be viewed as limiting the claimed subject matter to implementations that solve any or all of the disadvantages or problems presented above.

SUMMARY

An HMD device is configured with a sensor package that enables head tracking to determine the device user's proximity to holographic objects in a mixed reality or virtual reality environment. A fade volume including concentrically-arranged volumetric shells is placed around the user including a near shell that is closest to the user, and a far shell that is farthest from the user. When a holographic object is beyond the far shell, the HMD device renders the object with full opacity (i.e., with no transparency). As the user moves towards a holographic object and it intersects the far shell, its opacity begins to fade out with increasing transparency to reveal the background behind it. The transparency of the holographic object increases as the object gets closer to the near shell and the object becomes fully transparent when the near shell reaches it so that the background becomes fully visible.

In various illustrative examples, alpha compositing is utilized and an alpha value is determined on a per-pixel basis depending on respective proximity to the near and far shells. A transparency blend curve may be utilized to smoothly blend the per-pixel alpha value over the distance between the near and far shells. Fading opacity and increasing transparency as the user approaches holographic objects can help to reduce visual discomfort and prevent occlusion of the background that the objects would otherwise hide. In another example, transparency may be implemented using a dithering technique.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Furthermore, the claimed subject matter is not limited to implementations that solve any or all disadvantages noted in any part of this disclosure. It may be appreciated that the above-described subject matter may be implemented as a computer-controlled apparatus, a computer process, a computing system, or as an article of manufacture such as one or more computer-readable storage media. These and various other features may be apparent from a reading of the following Detailed Description and a review of the associated drawings.

DESCRIPTION OF THE DRAWINGS

Like reference numerals indicate like elements in the drawings. Elements are not drawn to scale unless otherwise indicated.

DETAILED DESCRIPTION

When experiencing a mixed or virtual reality environment while using an HMD device, users can move into holographic virtual objects as they move around in a corresponding real world space. Such movement can present technical challenges for the HMD device in accurately rendering objects as the draw distance decreases (and approaches zero) and may cause user discomfort due to mismatch in clip planes between each eye. In addition, as a holographic object fills the field of view of the HMD device as the user gets closer, the object can occlude vision of the floor or other objects. The present smart transparency provides for holographic object opacity that fades out (and transparency increases) as the HMD device user approaches to reduce both visual discomfort and occlusion of other objects such as the background object and floor.

Figure 1:
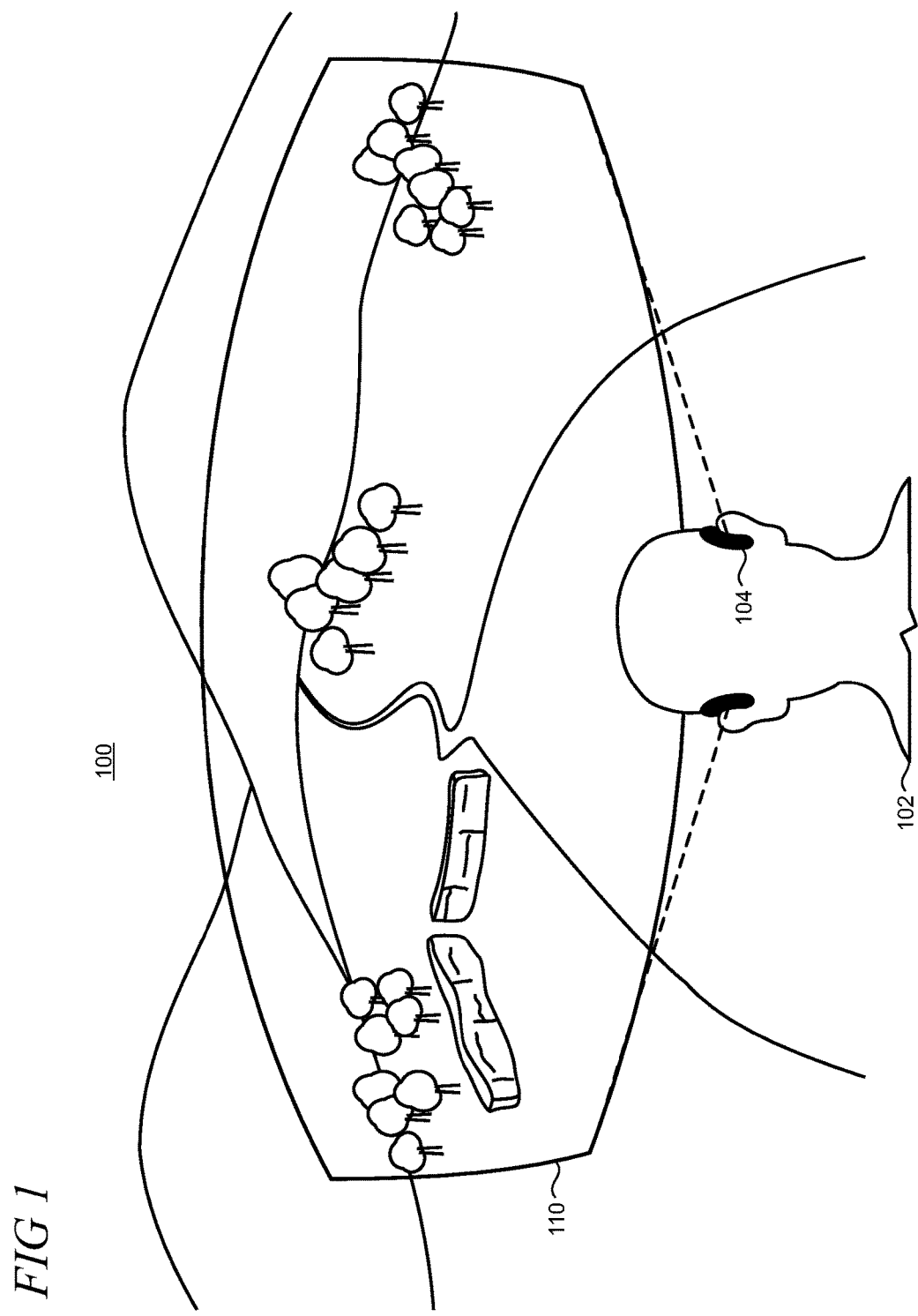
FIG. 1 shows an illustrative virtual reality environment, a portion of which is rendered within the view of a user of an HMD device.
Figure 2:
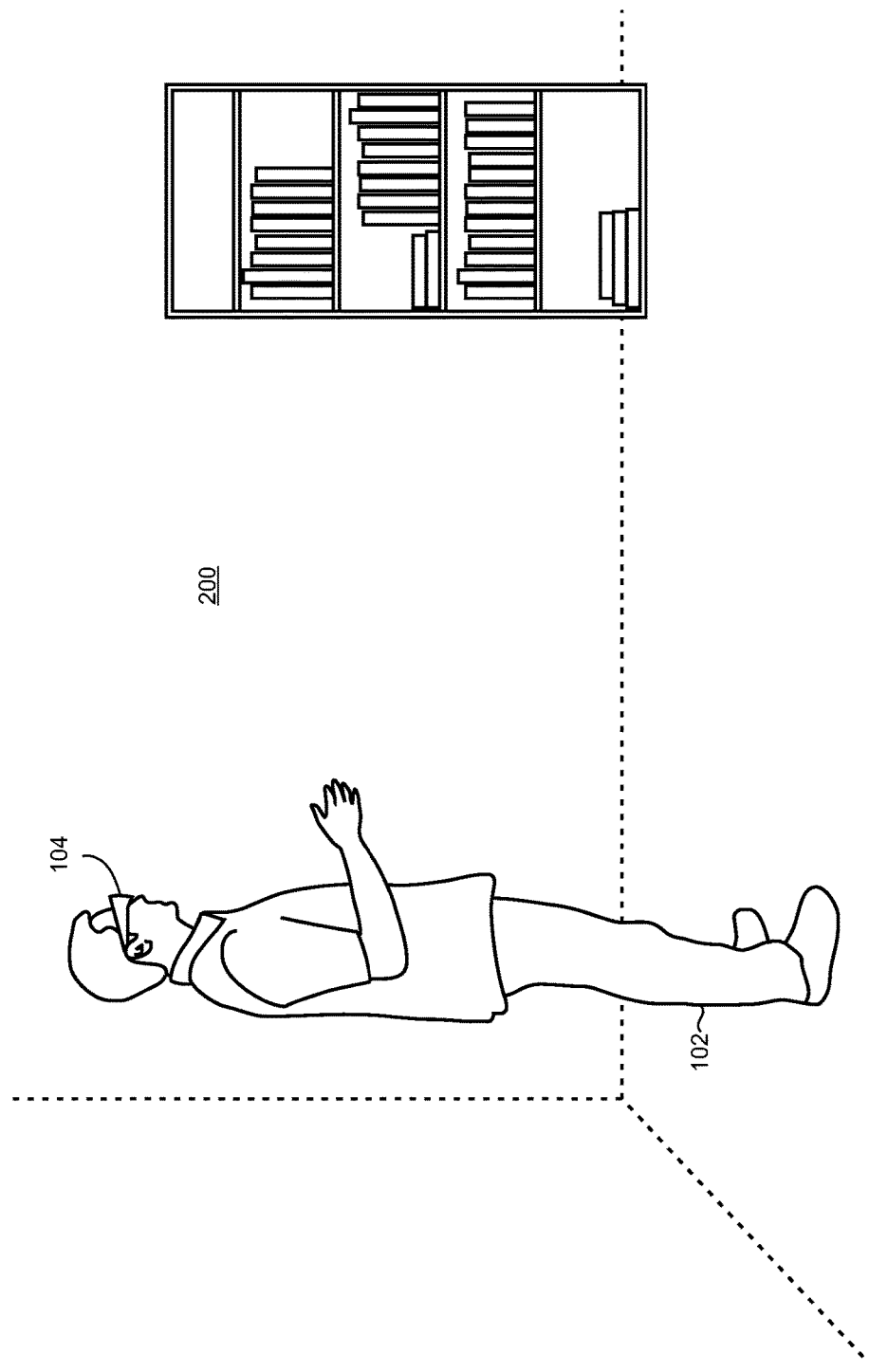
FIG. 2 shows an illustrative real world environment in which a user of an HMD device is located.

In an illustrative example, as shown in FIG. 1, a user 102 can employ an HMD device 104 to experience a virtual reality environment 100 that is rendered visually and may include audio and/or tactile/haptic sensations in some implementations. In this particular non-limiting example, an application executing on the HMD device 104 supports a virtual reality environment 100 that includes an outdoor landscape with plants and trees, rolling hills, fences, roads, etc., with which the user can interact and see. As the user changes the position or orientation of his head and/or moves within a corresponding real world physical environment 200 shown in FIG. 2, his view of the virtual reality environment can change. The field of view (represented by the dashed area 110 in FIG. 1) can be sized and shaped and other characteristics of the device can be controlled to make the HMD device experience visually immersive to provide the user with a strong sense of presence in the virtual world. While a virtual reality environment is shown and described herein, the present smart transparency can also be applied to mixed reality environments and scenarios.

Figure 3:
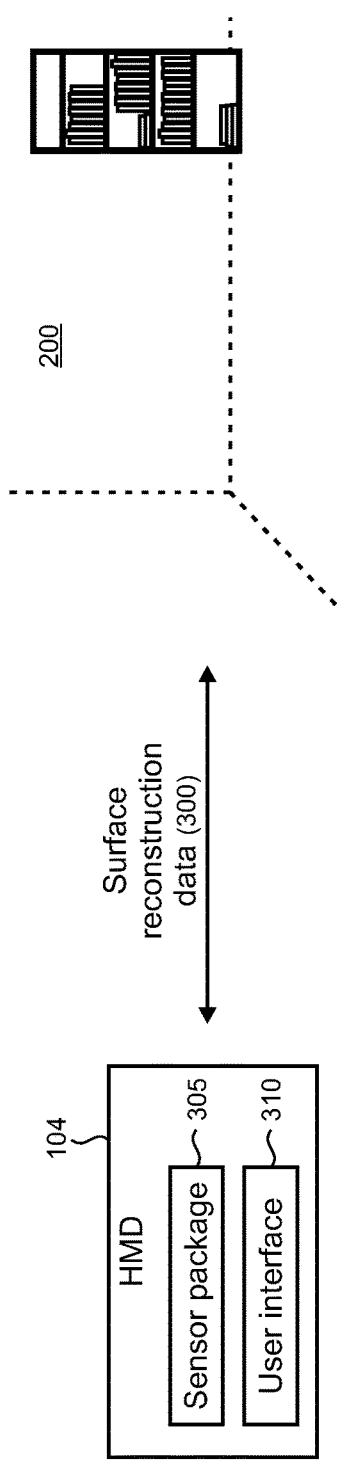
FIG. 3 depicts surface reconstruction data associated with real world objects being captured by an HMD device.

The HMD device 104 is configured to determine the position of the user in the virtual reality environment and his relationship to holographic objects by tracking the user's position, including his head, in the physical environment 200. As shown in FIG. 3, the device is configured to obtain surface reconstruction data 300 by using a sensor package 305 that may include an integrated depth sensor. In alternative implementations, depth data can be derived using suitable stereoscopic image analysis techniques. Surface reconstruction may be utilized, for example, for head tracking to determine the 3D (three-dimensional) position and orientation of the user's head within the physical real world environment 200 including head pose so that a view position of the virtual world can be determined.

The sensor package can also support gaze tracking to ascertain a direction of the user's gaze which may be used along with the head position and orientation data in some implementations. The HMD device 104 may further be configured to expose a user interface (UI) 310 that can display system messages, prompts, and the like as well as expose controls that the user may manipulate. The controls can be virtual or physical in some cases. The UI 310 may also be configured to operate with sensed gestures and voice using, for example, voice commands or natural language.

Figure 4:
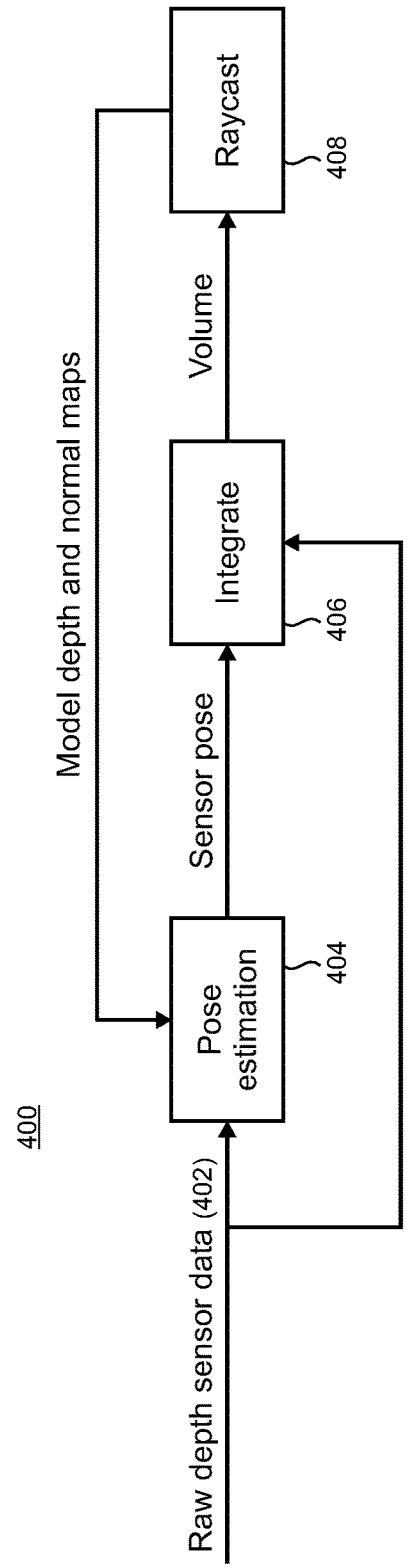
FIG. 4 shows a block diagram of an illustrative surface reconstruction pipeline.

FIG. 4 shows an illustrative surface reconstruction data pipeline 400 for obtaining surface reconstruction data for objects in the real world space. It is emphasized that the disclosed technique is illustrative and that other techniques and methodologies may be utilized depending on the requirements of a particular implementation. Raw depth sensor data 402 is input into a 3D (three-dimensional) pose estimate of the sensor (block 404). Sensor pose tracking can be achieved, for example, using ICP (iterative closest point) alignment between the predicted surface and current sensor measurement. Each depth measurement of the sensor can be integrated (block 406) into a volumetric representation using, for example, surfaces encoded as a signed distance field (SDF). Using a loop, the SDF is raycast (block 408) into the estimated frame to provide a dense surface prediction to which the depth map is aligned.

Figure 5:
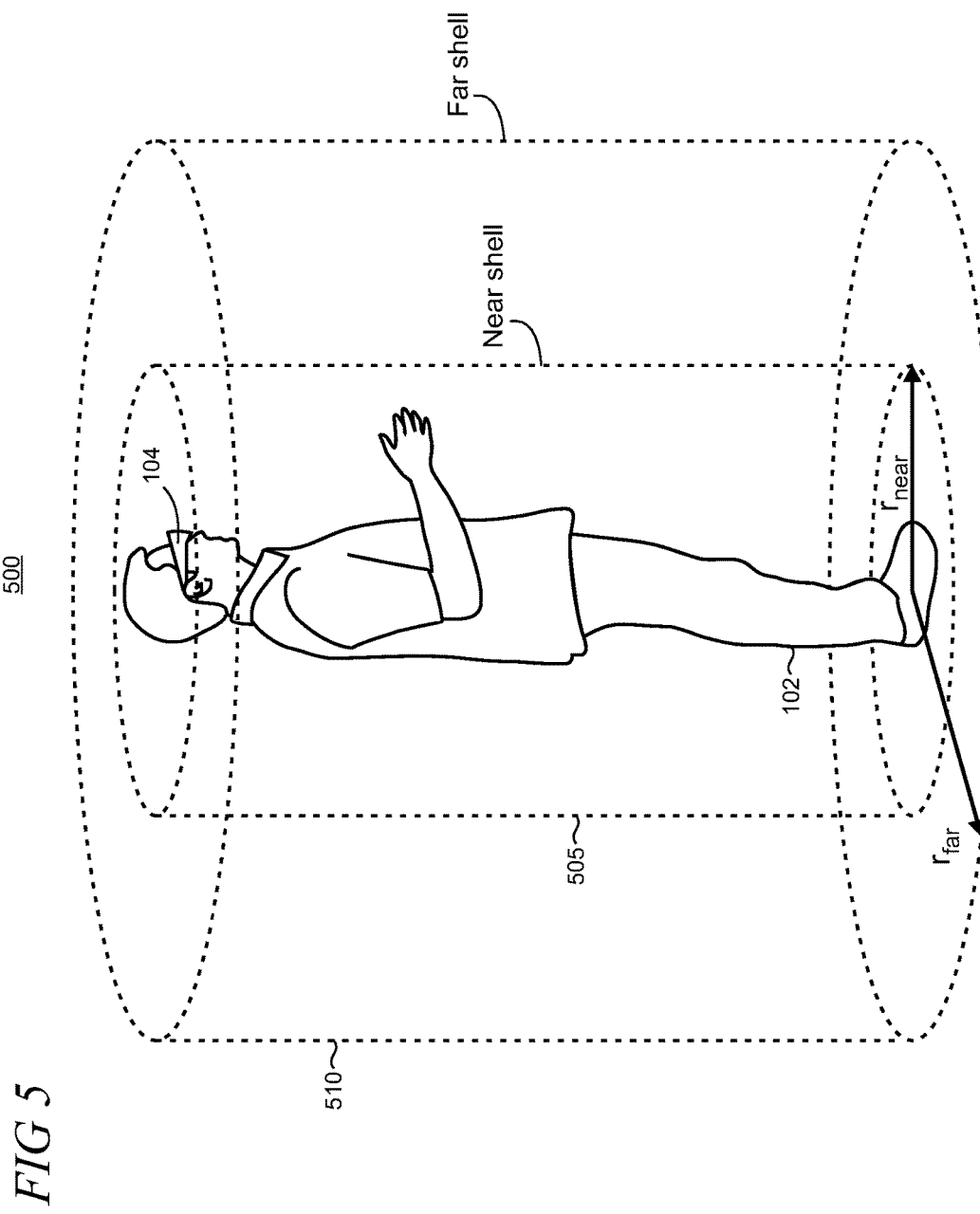
FIG. 5 shows an HMD device user being represented by an illustrative fade volume that is sized according the user's height and uses concentric shells.

To determine when a user is close to a holographic object, the HMD device 104 places a fade volume 500 around the user 102, as shown in FIG. 5, which includes a near shell 505 and a far shell 510. In this particular illustrative example and not by way of limitation, the shells 505 and 510 are cylindrical and substantially concentrically aligned and the radius of the near shell, $r_{near}$, is approximately a half meter and the radius of the far shell, $r_{far}$ is approximately one meter. It is emphasized that the concentricity and the radius dimensions are intended to be illustrative and that other arrangements and dimensions may be utilized to suit a particular application of smart transparency.

The fade volume 500 can be configured using a variety of geometries such as the cylinder as depicted in FIG. 5, capsules, or spheres, or other shapes, and it is noted that the fade volume may be implemented using non-radial volumes in some cases. The fade volume is generally sized according to the user's head location within the physical environment and may change accordingly as the user's head height above the ground changes, for example, if the user ducks or keeps low while moving. The user's head height can be determined using any suitable technique including, for example, head tracking using the HMD's sensor package as described above, image analyses for estimating the user's head height from the floor, or with external/remote methods.

Figure 6:
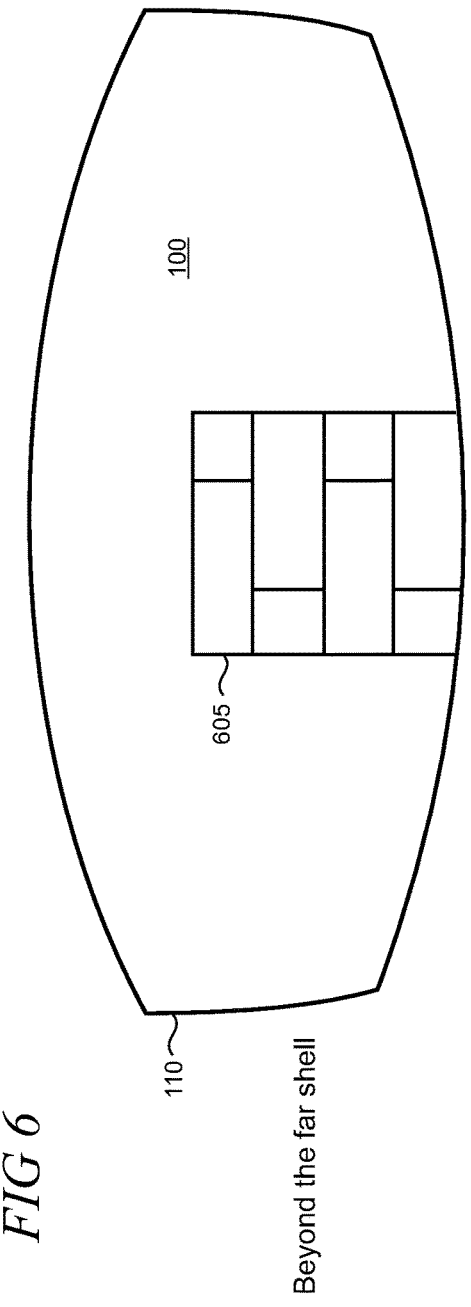
FIG. 6 shows an illustrative virtual object that is non-transparently rendered in the field of view of an HMD device when the object is located at, or beyond, the far shell of the fade volume.
Figure 7:
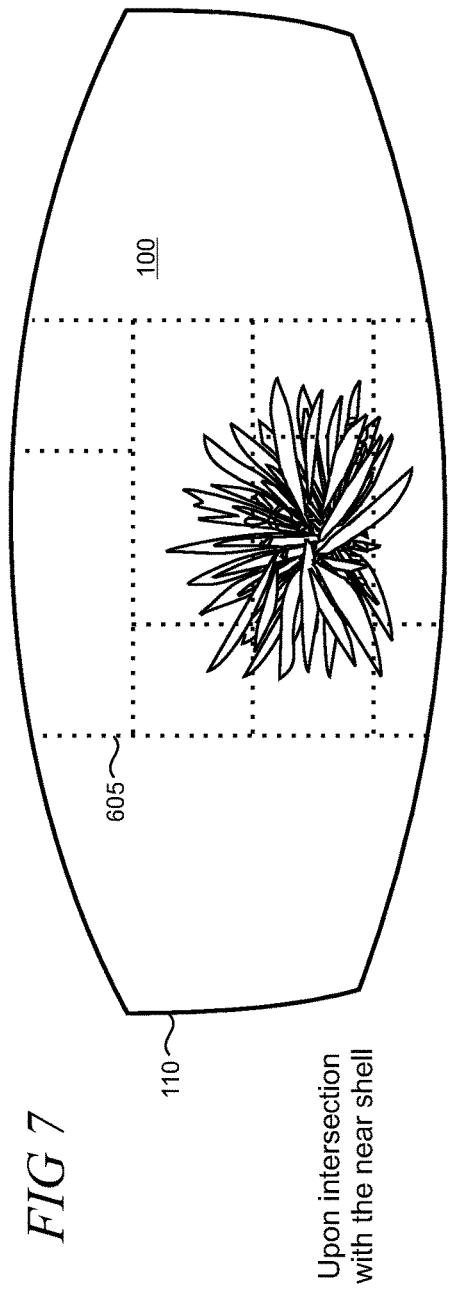
FIG. 7 shows an illustrative virtual object that is transparently rendered in the field of view of an HMD device when the object is located at, or within, the near shell of the fade volume.

As the user moves in the virtual reality environment 100 (FIG. 1) the distance from the fade volume 500 to a given holographic object is continuously determined. In an illustrative example, an alpha value is set by the HMD device in an alpha compositing process to render the object with full opacity, full transparency, or some degree of transparency depending on the object's proximity to the near and far shells. For example, as shown in FIG. 6, a wall 605 in the virtual world 100 is rendered on the HMD's field of view 110 with full opacity when it is located beyond the far shell 510 (FIG. 5) of the fade volume 500. As the user moves towards the wall, when the wall reaches the near shell 505 of the fade volume, the HMD device will render the wall with full transparency (full transparency is indicated with dotted lines in the drawings) so that whatever is behind the wall (e.g., other objects and/or the ground) is visible, as illustratively depicted in FIG. 7.

Figure 8:
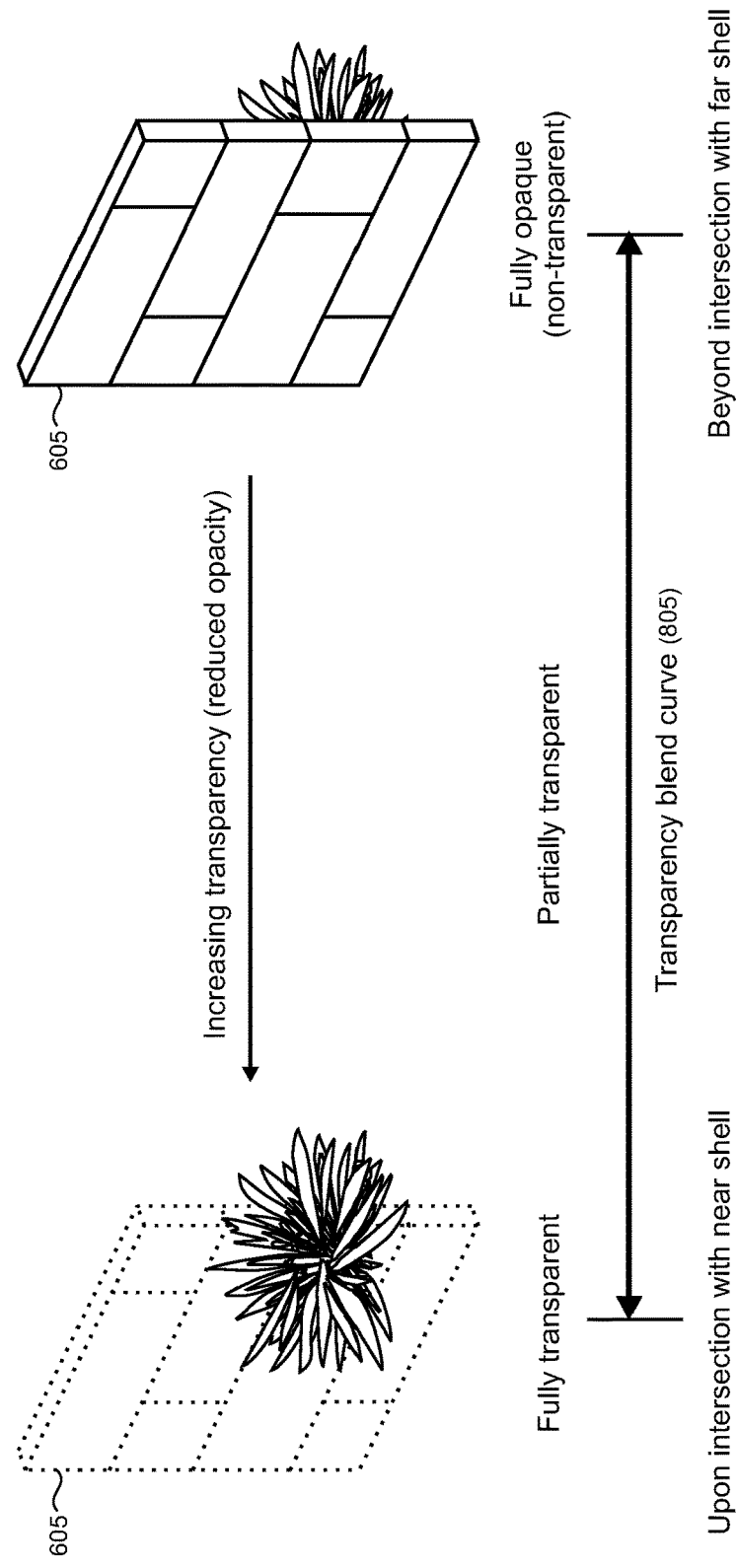
FIG. 8 shows an illustrative transparency blend curve that is applied to virtual objects as they are located at various points between the near and far shells of the fade volume.

As shown in FIG. 8, as the user moves and the wall 605 passes between the far and near shells in the fade volume, the wall is rendered with increasing transparency as it gets closer to the near shell. That is, the wall is fully opaque beyond the far shell. As the user moves towards the wall, the wall becomes more transparent as the user draws closer (so the user can begin to see what is behind the wall), until the wall becomes fully transparent when the user becomes so close that the wall intersects the near shell (so the user has complete visibility of the virtual world that is behind the wall).

The alpha compositing of the transparency may be performed on a per-pixel basis and the alpha value can be varied using a transparency blend curve that is imposed over the spatial distance between the near and far shells, as represented by reference numeral 805 in FIG. 8. For example, the transparency blend may be determined based on a value between 0 and 1 that describes a ratio of the holographic object's respective distances from the near and far shells. Accordingly, the transparency blend curve 805 can be selected from any function that blends from 0 and 1 over the distance range between the near and far shells. For example, the alpha value can be linearly interpolated over the distance range but other transparency blend curves using non-linear functions may also be utilized to meets the requirements of a particular implementation of smart transparency.

In some implementations of smart transparency, adjustments may be made to properties of a holographic object other than alpha value. For example, the RGB (red, green, blue) channel values of a holographic object can be adjusted to fade the object to black. When implemented in an HMD device that uses an additive display, holographic content rendered in black is transparent so that real world objects are visible. Such real world visibility can be utilized in mixed reality environments that support a combination of holographic and real world content. For example, as the user moves closer to a holographic object, it is rendered to black to become transparent and reveal portions of the real world that are behind it.

Other techniques to implement smart transparency may also be utilized for a given application. For example, in addition to alpha compositing, dithering techniques such as ordered dithering can be utilized in which a threshold matrix provides multiple dithering patterns for the holographic object to produce varying degrees of transparency. A pixel in the holographic object is discarded (and become invisible) when it is below a given threshold. The threshold matrix can be implemented as a dither matrix (also commonly referred to as an index matrix or Bayer matrix) which typically provides a regular dithering pattern, however, random permutations of the threshold values can also be utilized in some cases.

Figure 9:
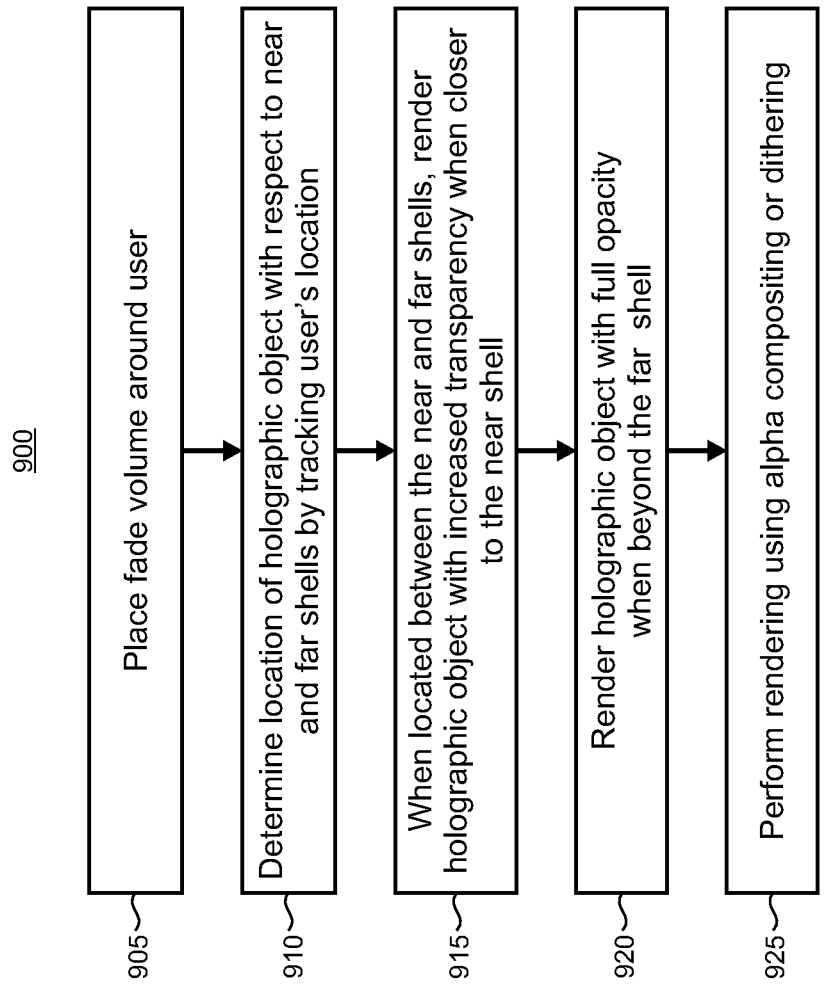
FIGS. 9, 10, and 11 are flowcharts of illustrative methods that may be performed using an HMD device.
Figure 10:
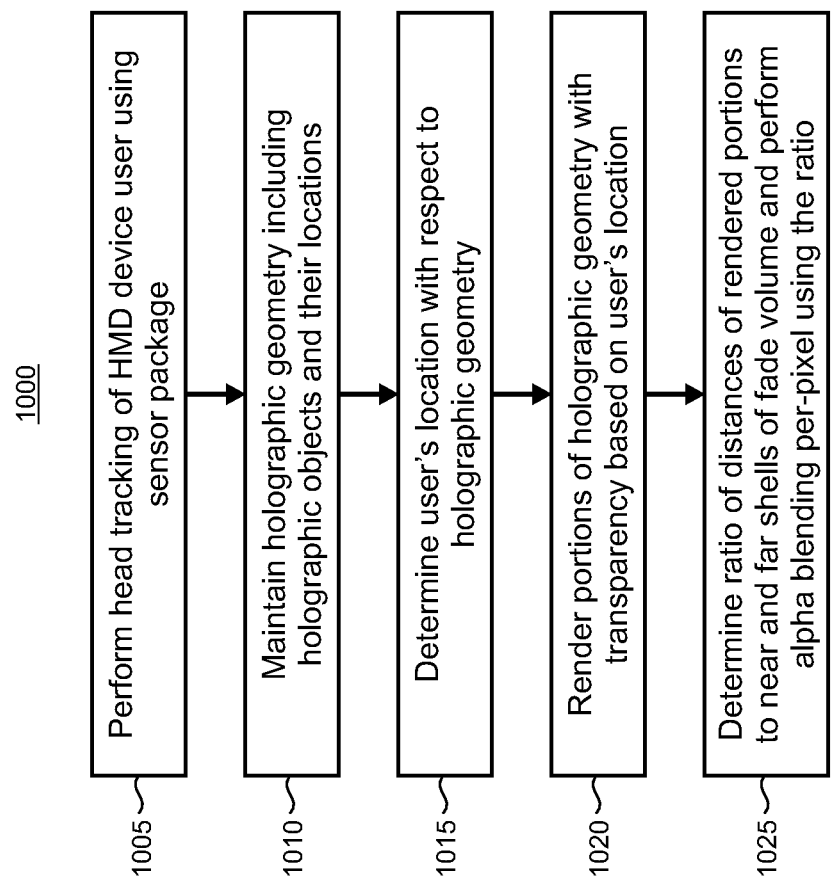
Figure 11:
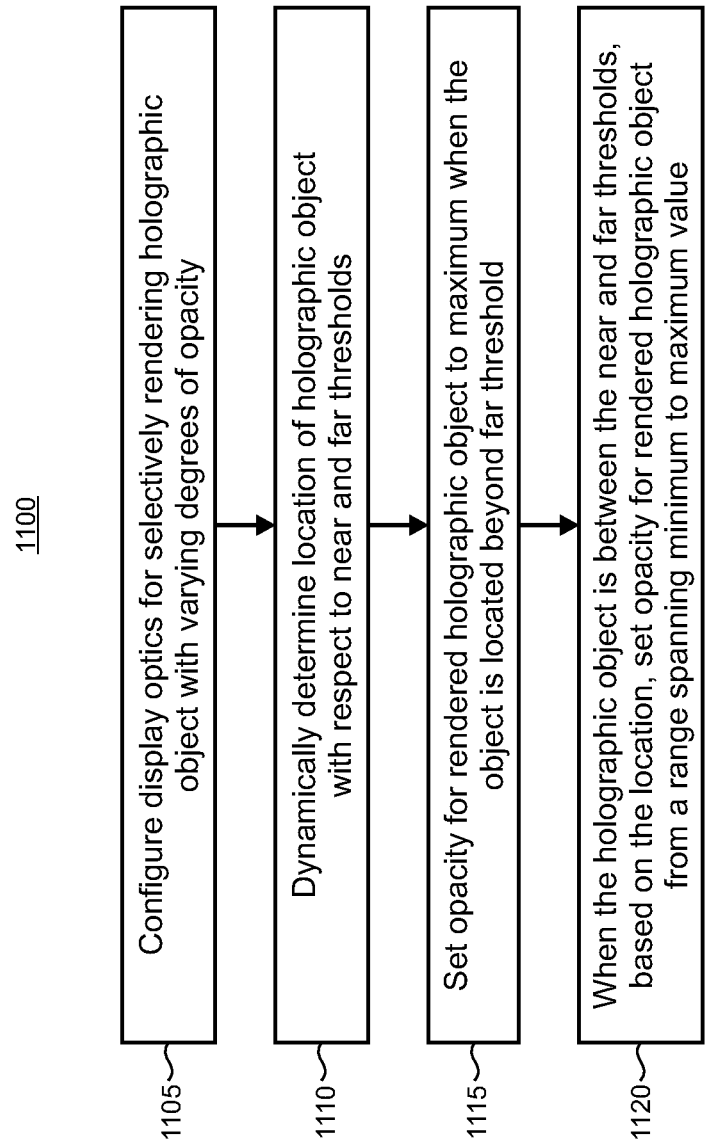

FIGS. 9, 10, and 11 are flowcharts of illustrative methods that may be performed using the HMD device 104. Unless specifically stated, the methods or steps shown in the flowcharts and described in the accompanying text are not constrained to a particular order or sequence. In addition, some of the methods or steps thereof can occur or be performed concurrently and not all the methods or steps have to be performed in a given implementation depending on the requirements of such implementation and some methods or steps may be optionally utilized.

Method 900 shown in FIG. 9 may be performed by an HMD device supporting rendering of a mixed reality or virtual reality environment that is operable by a user in a physical environment. In step 905, a fade volume is placed around the device user. The fade volume has a near shell that is proximate (i.e., near) to the user and a far shell that is distal (i.e., away) from the user. The fade volume can be sized according to the user's current head height which can be determined using the onboard sensor package in the HMD device and may be configured using cylinders or spheres, for example. In step 910, a location of a holographic object is determined by tracking the user's location within the mixed reality or virtual reality environment. Such tracking may be performed, for example, using head tracking that may be enabled using the sensor package that supports depth sensing and other capabilities.

In step 915, when the holographic object is located between the near and far shells, it is rendered with increased transparency as the location is closer to the near shell. When the location intersects the near shell, the holographic object may be rendered with full transparency to reveal the background of the environment. In step 920, the holographic object is rendered by the HMD device when it is located beyond the far shell. In step 925, the rendering of the holographic object may be performed using alpha compositing and on per-pixel basis in some implementations. An alpha value can be interpolated based on a transparency curve that is established over the spatial distance between the near and far shells. The interpolation may be linear in some cases. Rendering may also be alternatively implemented using a dithering technique such as ordered dithering.

Method 1000 shown in FIG. 10 may be performed by a HMD device having one or more processors, a display for rendering a mixed reality or virtual reality environment using a variable field of view, a sensor package, and one or more memory devices that store computer-readable instructions such as software code that can be utilized to implement the method. In step 1005, head tracking of the HMD device user is performed using the onboard sensor package. A holographic geometry is maintained in step 1010 that includes one or more holographic objects with known locations in the environment. In step 1015, in response to the head tracking, the user's location with respect to the holographic geometry is determined Portions of the holographic geometry are rendered with some degree of transparency based on the user's location so that transparency is increased as the distance between the location and the rendered portions decrease in step 1020. A ratio of distances of the rendered portions with respective near and fall shells of a fade volume that is placed around the user in step 1025 and alpha blending is performed using the ratio on a per-pixel basis.

Method 1100 in FIG. 11 may be performed by instructions stored on an HMD device operating in a real world environment. In step 1105, display optics in the HMD device are configured for selectively rendering a holographic object with varying degrees of opacity. In step 1110, a location of a holographic object is dynamically determined with respect to each of near and far thresholds using sensors that are incorporated into the device. In step 1115, opacity for a rendered holographic object is set to a maximum value when the object is located beyond the far threshold. In step 1120, when the holographic object is located between the near and far thresholds, based the location, the opacity for the rendered holographic object is set from a range that spans a minimum and the maximum value.

Figure 12:
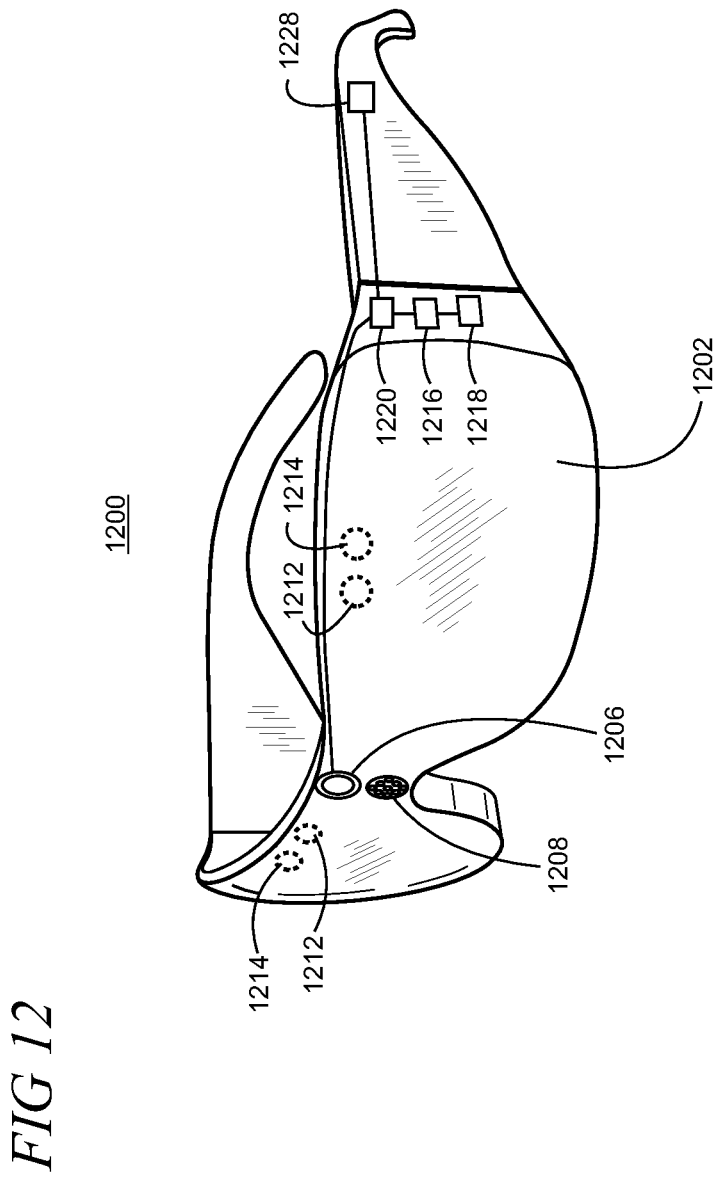
FIG. 12 is a pictorial view of an illustrative example of a mixed reality HMD device.
Figure 13:
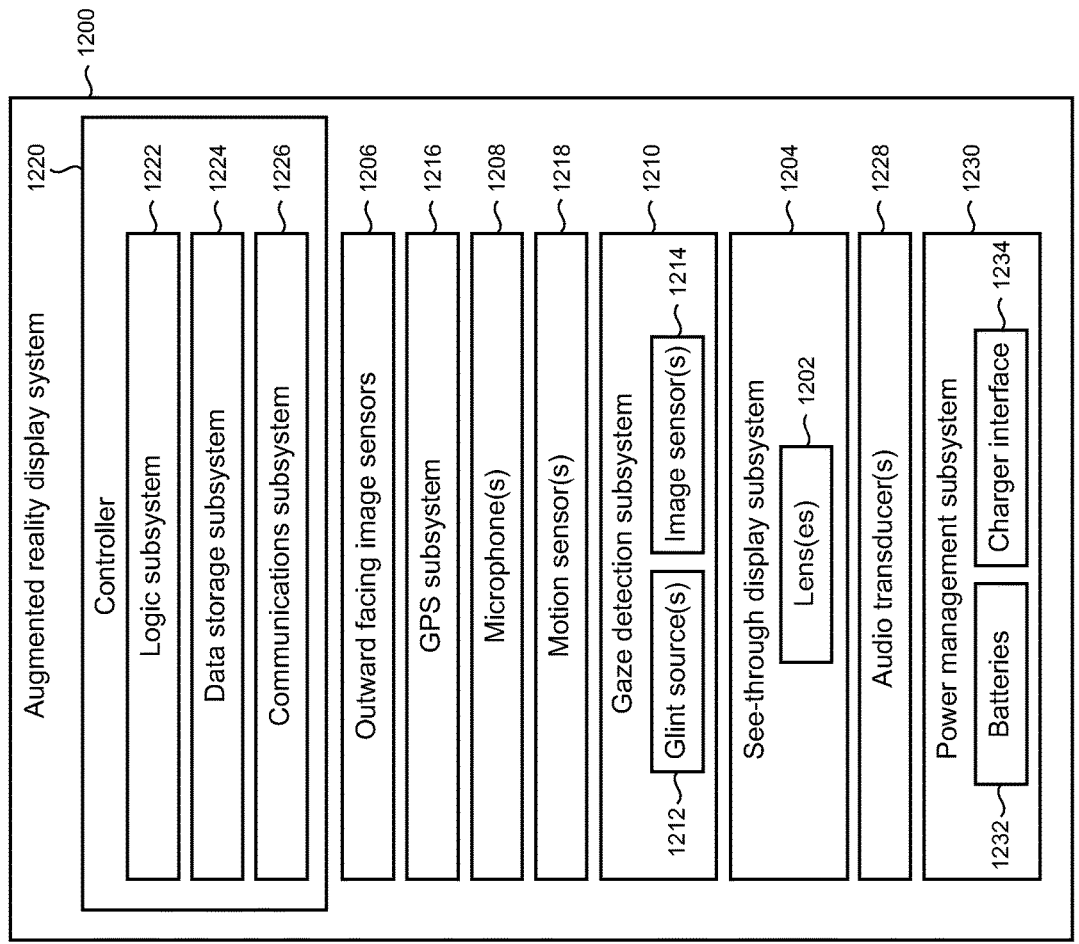
FIG. 13 shows a functional block diagram of an illustrative example of a mixed reality HMD device.
Figure 14:
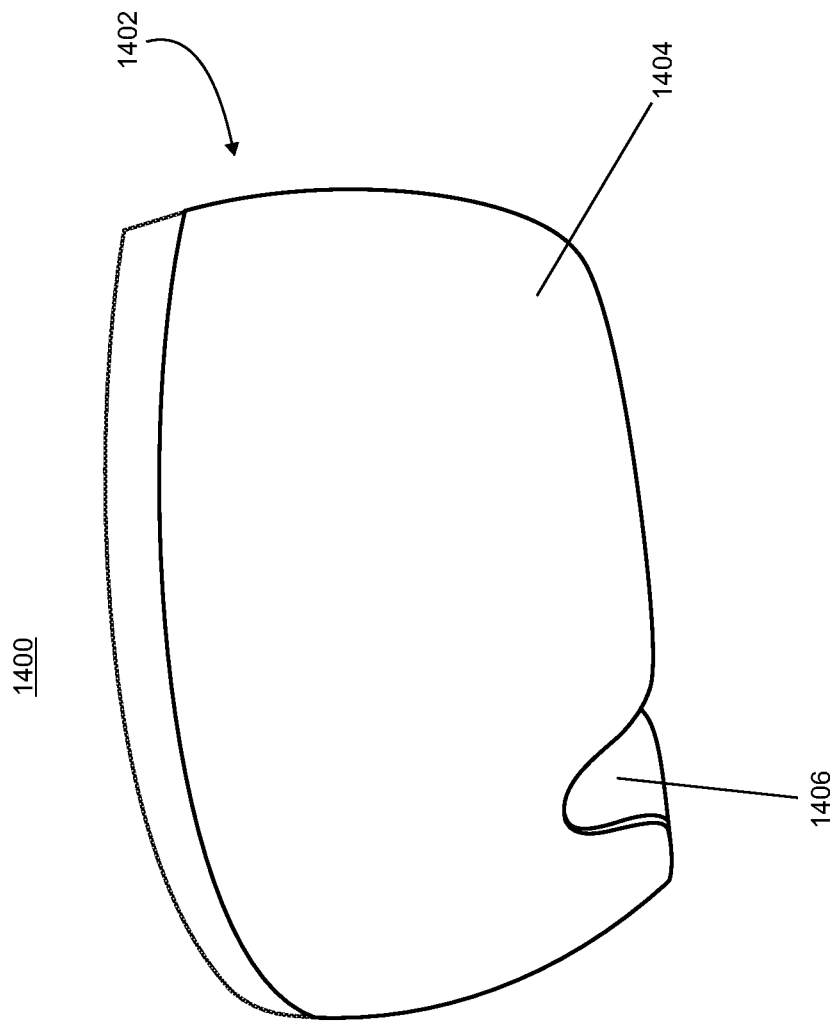
FIGS. 14 and 15 are pictorial front views of a sealed visor that may be used as a component of a mixed reality HMD device.
Figure 15:
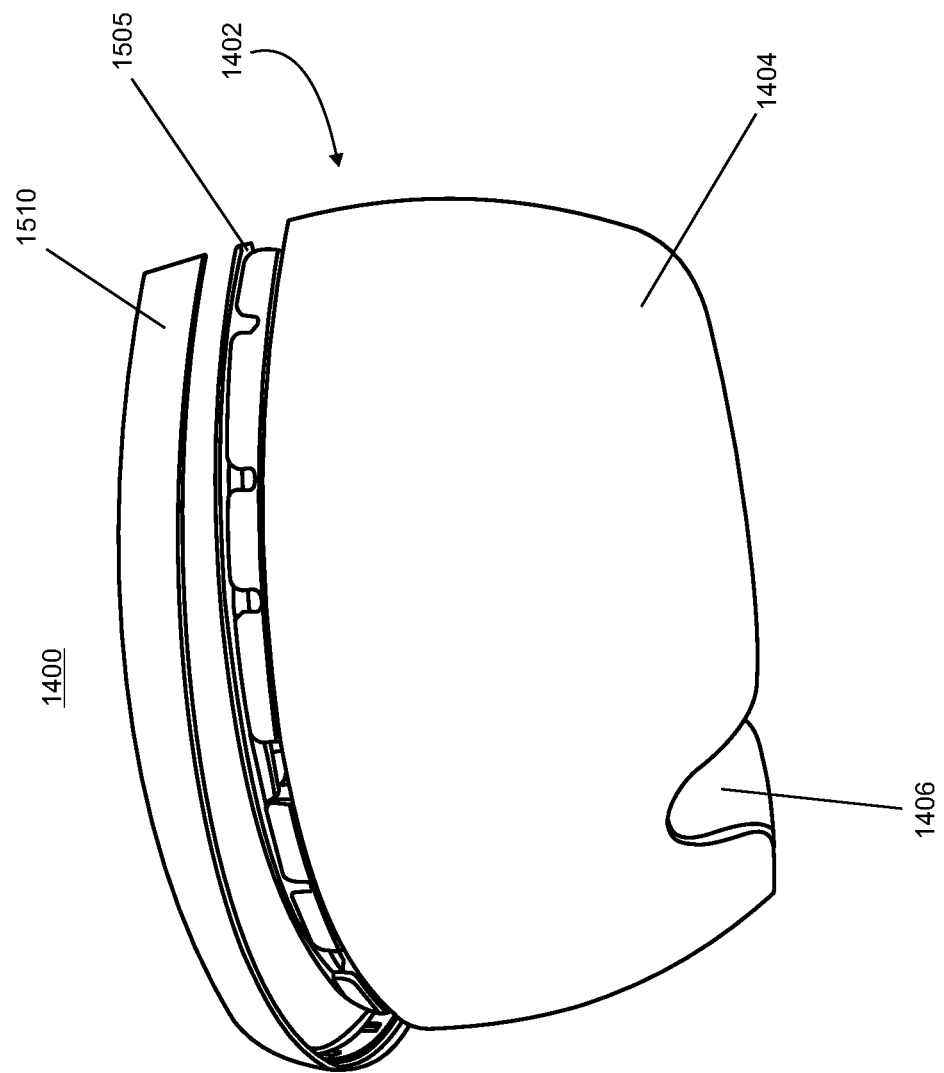

Turning now to various illustrative implementation details, a mixed and/or virtual reality display device according to the present arrangement may take any suitable form, including but not limited to near-eye devices such as the HMD device 104 and/or other portable/mobile devices. A see-through display may be used in some implementations while an opaque (i.e., non-see-through) display using a camera-based pass-through or outward facing sensor, for example, may be used in other implementations. FIG. 12 shows one particular illustrative example of a see-through, mixed reality display system 1200, and FIG. 13 shows a functional block diagram of the system 1200. Display system 1200 comprises one or more lenses 1202 that form a part of a see-through display subsystem 1204, such that images may be displayed using lenses 1202 (e.g. using projection onto lenses 1202, one or more waveguide systems incorporated into the lenses 1202, and/or in any other suitable manner). Display system 1200 further comprises one or more outward-facing image sensors 1206 configured to acquire images of a background scene and/or physical environment being viewed by a user, and may include one or more microphones 1208 configured to detect sounds, such as voice commands from a user. Outward-facing image sensors 1206 may include one or more depth sensors and/or one or more two-dimensional image sensors. In alternative arrangements, as noted above, a mixed reality display system, instead of incorporating a see-through display subsystem, may display mixed reality images through a viewfinder mode for an outward-facing image sensor.

The display system 1200 may further include a gaze detection subsystem 1210 configured for detecting a direction of gaze of each eye of a user or a direction or location of focus, as described above. Gaze detection subsystem 1210 may be configured to determine gaze directions of each of a user's eyes in any suitable manner. For example, in the illustrative example shown, a gaze detection subsystem 1210 includes one or more glint sources 1212, such as infrared light sources, that are configured to cause a glint of light to reflect from each eyeball of a user, and one or more image sensors 1214, such as inward-facing sensors, that are configured to capture an image of each eyeball of the user. Changes in the glints from the user's eyeballs and/or a location of a user's pupil, as determined from image data gathered using the image sensor(s) 1214, may be used to determine a direction of gaze.

In addition, a location at which gaze lines projected from the user's eyes intersect the external display may be used to determine an object at which the user is gazing (e.g. a displayed virtual object and/or real background object). Gaze detection subsystem 1210 may have any suitable number and arrangement of light sources and image sensors. In some implementations, the gaze detection subsystem 1210 may be omitted.

The display system 1200 may also include additional sensors. For example, display system 1200 may comprise a global positioning system (GPS) subsystem 1216 to allow a location of the display system 1200 to be determined. This may help to identify real world objects, such as buildings, etc. that may be located in the user's adjoining physical environment.

The display system 1200 may further include one or more motion sensors 1218 (e.g., inertial, multi-axis gyroscopic, or acceleration sensors) to detect movement and position/orientation/pose of a user's head when the user is wearing the system as part of an augmented reality HMD device. Motion data may be used, potentially along with eye-tracking glint data and outward-facing image data, for gaze detection, as well as for image stabilization to help correct for blur in images from the outward-facing image sensor(s) 1206. The use of motion data may allow changes in gaze location to be tracked even if image data from outward-facing image sensor(s) 1206 cannot be resolved.

In addition, motion sensors 1218, as well as microphone(s) 1208 and gaze detection subsystem 1210, also may be employed as user input devices, such that a user may interact with the display system 1200 via gestures of the eye, neck and/or head, as well as via verbal commands in some cases. It may be understood that sensors illustrated in FIGS. 12 and 13 and described in the accompanying text are included for the purpose of example and are not intended to be limiting in any manner, as any other suitable sensors and/or combination of sensors may be utilized to meet the needs of a particular implementation of an augmented reality HMD device. For examples, biometric sensors (e.g., for detecting heart and respiration rates, blood pressure, brain activity, body temperature, etc.) or environmental sensors (e.g., for detecting temperature, humidity, elevation, UV (ultraviolet) light levels, etc.) may be utilized in some implementations.

The display system 1200 can further include a controller 1220 having a logic subsystem 1222 and a data storage subsystem 1224 in communication with the sensors, gaze detection subsystem 1210, display subsystem 1204, and/or other components through a communications subsystem 1226. The communications subsystem 1226 can also facilitate the display system being operated in conjunction with remotely located resources, such as processing, storage, power, data, and services. That is, in some implementations, an HMD device can be operated as part of a system that can distribute resources and capabilities among different components and subsystems.

The storage subsystem 1224 may include instructions stored thereon that are executable by logic subsystem 1222, for example, to receive and interpret inputs from the sensors, to identify location and movements of a user, to identify real objects using surface reconstruction and other techniques, and dim/fade the display based on distance to objects so as to enable the objects to be seen by the user, among other tasks.

The display system 1200 is configured with one or more audio transducers 1228 (e.g., speakers, earphones, etc.) so that audio can be utilized as part of an augmented reality experience. A power management subsystem 1230 may include one or more batteries 1232 and/or protection circuit modules (PCMs) and an associated charger interface 1234 and/or remote power interface for supplying power to components in the display system 1200.

It may be appreciated that the depicted display devices 104 and 1200 are described for the purpose of example, and thus are not meant to be limiting. It is to be further understood that the display device may include additional and/or alternative sensors, cameras, microphones, input devices, output devices, etc. than those shown without departing from the scope of the present arrangement. Additionally, the physical configuration of a display device and its various sensors and subcomponents may take a variety of different forms without departing from the scope of the present arrangement.

FIGS. 14-18 show an illustrative alternative implementation for an augmented reality display system 1400 that may be used as a component of an HMD device. In this example, the system 1400 uses a see-through sealed visor 1402 that is configured to protect the internal optics assembly utilized for the see-through display subsystem. The visor 1402 is typically interfaced with other components of the HMD device (not shown) such as head mounting/retention systems and other subsystems including sensors, power management, controllers, etc., as illustratively described in conjunction with FIGS. 12 and 13. Suitable interface elements (not shown) including snaps, bosses, screws and other fasteners, etc. may also be incorporated into the visor 1402.

The visor includes see-through front and rear shields 1404 and 1406 respectively that can be molded using transparent materials to facilitate unobstructed vision to the optical displays and the surrounding real world environment. Treatments may be applied to the front and rear shields such as tinting, mirroring, anti-reflective, anti-fog, and other coatings, and various colors and finishes may also be utilized. The front and rear shields are affixed to a chassis 1505 as depicted in the partially exploded view in FIG. 15 in which a shield cover 1510 is shown as disassembled from the visor 1402.

The sealed visor 1402 can physically protect sensitive internal components, including an optics display subassembly 1602 (shown in the disassembled view in FIG. 16) when the HMD device is worn and used in operation and during normal handling for cleaning and the like. The visor 1402 can also protect the optics display subassembly 1602 from environmental elements and damage should the HMD device be dropped or bumped, impacted, etc. The optics display subassembly 1602 is mounted within the sealed visor in such a way that the shields do not contact the subassembly when deflected upon drop or impact.

Figure 16:
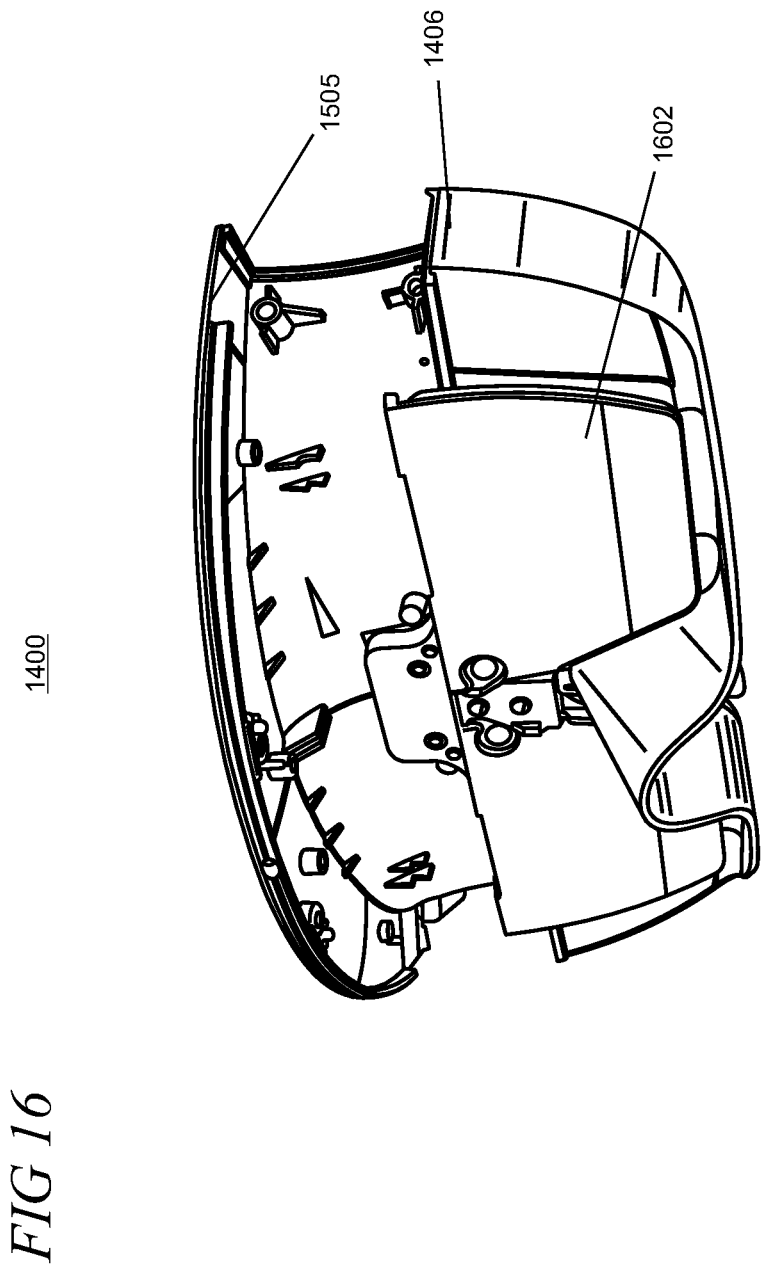
FIG. 16 shows a partially disassembled view of the sealed visor.
Figure 17:
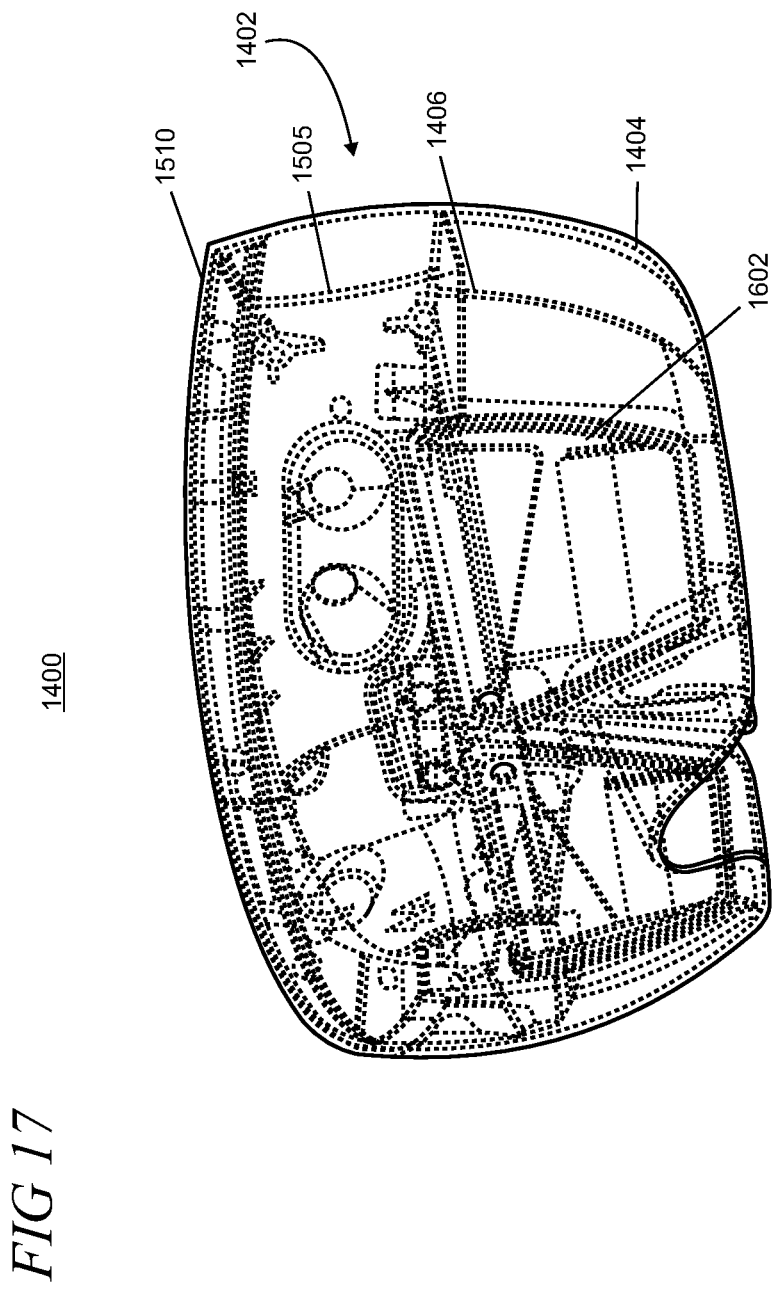
FIG. 17 shows a phantom line front view of the sealed visor.
Figure 18:
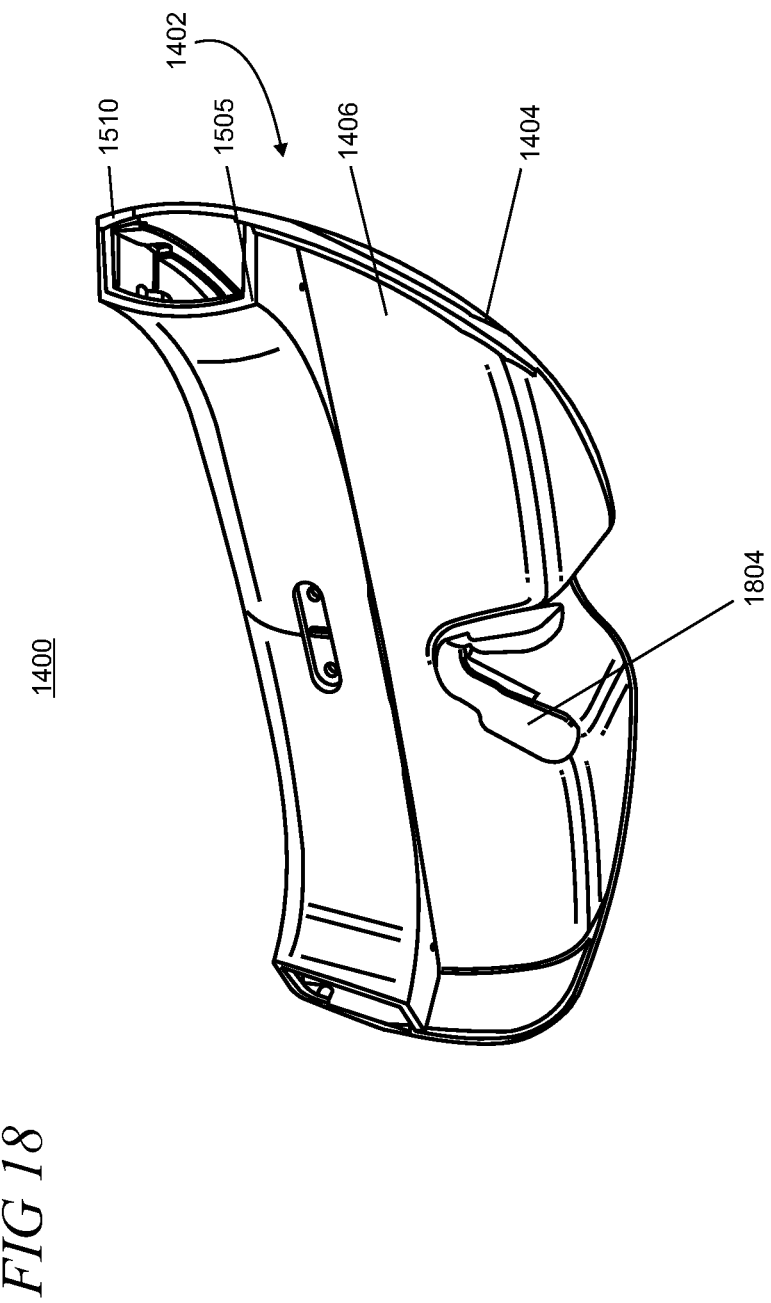
FIG. 18 shows a pictorial back view of the sealed visor.

As shown in FIGS. 16 and 18, the rear shield 1406 is configured in an ergonomically correct form to interface with the user's nose and nose pads 1804 (FIG. 18) and other comfort features can be included (e.g., molded-in and/or added-on as discrete components). The sealed visor 1402 can also incorporate some level of optical diopter curvature (i.e., eye prescription) within the molded shields in some cases.

Figure 19:
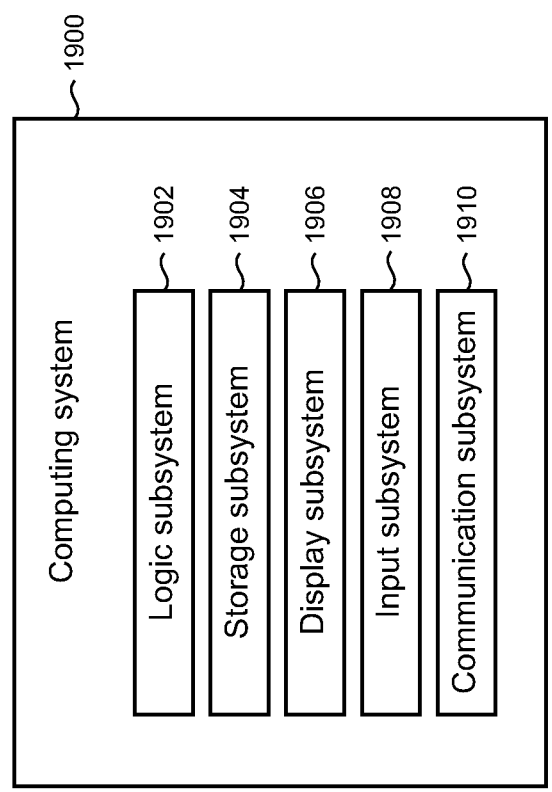
FIG. 19 shows an exemplary computing system.

FIG. 19 schematically shows a non-limiting embodiment of a computing system 1900 that can be used when implementing one or more of the configurations, arrangements, methods, or processes described above. The HMD device 104 may be one non-limiting example of computing system 1900. The computing system 1900 is shown in simplified form. It may be understood that virtually any computer architecture may be used without departing from the scope of the present arrangement. In different embodiments, computing system 1900 may take the form of a display device, wearable computing device, mainframe computer, server computer, desktop computer, laptop computer, tablet computer, home-entertainment computer, network computing device, gaming device, mobile computing device, mobile communication device (e.g., smart phone), etc.

The computing system 1900 includes a logic subsystem 1902 and a storage subsystem 1904. The computing system 1900 may optionally include a display subsystem 1906, an input subsystem 1908, a communication subsystem 1910, and/or other components not shown in FIG. 19.

The logic subsystem 1902 includes one or more physical devices configured to execute instructions. For example, the logic subsystem 1902 may be configured to execute instructions that are part of one or more applications, services, programs, routines, libraries, objects, components, data structures, or other logical constructs. Such instructions may be implemented to perform a task, implement a data type, transform the state of one or more components, or otherwise arrive at a desired result.

The logic subsystem 1902 may include one or more processors configured to execute software instructions. Additionally or alternatively, the logic subsystem 1902 may include one or more hardware or firmware logic machines configured to execute hardware or firmware instructions. The processors of the logic subsystem 1902 may be single-core or multi-core, and the programs executed thereon may be configured for sequential, parallel, or distributed processing. The logic subsystem 1902 may optionally include individual components that are distributed among two or more devices, which can be remotely located and/or configured for coordinated processing. Aspects of the logic subsystem 1902 may be virtualized and executed by remotely accessible, networked computing devices configured in a cloud-computing configuration.

The storage subsystem 1904 includes one or more physical devices configured to hold data and/or instructions executable by the logic subsystem 1902 to implement the methods and processes described herein. When such methods and processes are implemented, the state of the storage subsystem 1904 may be transformed—for example, to hold different data.

The storage subsystem 1904 may include removable media and/or built-in devices. The storage subsystem 1904 may include optical memory devices (e.g., CD (compact disc), DVD (digital versatile disc), HD-DVD (high definition DVD), Blu-ray disc, etc.), semiconductor memory devices (e.g., RAM (random access memory), ROM (read only memory), EPROM (erasable programmable ROM), EEPROM (electrically erasable ROM), etc.) and/or magnetic memory devices (e.g., hard-disk drive, floppy-disk drive, tape drive, MRAM (magneto-resistive RAM), etc.), among others. The storage subsystem 1904 may include volatile, nonvolatile, dynamic, static, read/write, read-only, random-access, sequential-access, location-addressable, file-addressable, and/or content-addressable devices.

It may be appreciated that the storage subsystem 1904 includes one or more physical devices, and excludes propagating signals per se. However, in some implementations, aspects of the instructions described herein may be propagated by a pure signal (e.g., an electromagnetic signal, an optical signal, etc.) using a communications medium, as opposed to being stored on a storage device. Furthermore, data and/or other forms of information pertaining to the present arrangement may be propagated by a pure signal.

In some embodiments, aspects of the logic subsystem 1902 and of the storage subsystem 1904 may be integrated together into one or more hardware-logic components through which the functionality described herein may be enacted. Such hardware-logic components may include field-programmable gate arrays (FPGAs), program- and application-specific integrated circuits (PASIC/ASICs), program- and application-specific standard products (PSSP/ASSPs), system-on-a-chip (SOC) systems, and complex programmable logic devices (CPLDs), for example.

When included, the display subsystem 1906 may be used to present a visual representation of data held by storage subsystem 1904. This visual representation may take the form of a graphical user interface (GUI). As the present described methods and processes change the data held by the storage subsystem, and thus transform the state of the storage subsystem, the state of the display subsystem 1906 may likewise be transformed to visually represent changes in the underlying data. The display subsystem 1906 may include one or more display devices utilizing virtually any type of technology. Such display devices may be combined with logic subsystem 1902 and/or storage subsystem 1904 in a shared enclosure in some cases, or such display devices may be peripheral display devices in others.

When included, the input subsystem 1908 may include or interface with one or more user-input devices such as a keyboard, mouse, touch screen, or game controller. In some embodiments, the input subsystem may include or interface with selected natural user input (NUI) components. Such components may be integrated or peripheral, and the transduction and/or processing of input actions may be handled on- or off-board. Exemplary NUI components may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing components for assessing brain activity.

When included, the communication subsystem 1910 may be configured to communicatively couple the computing system 1900 with one or more other computing devices. The communication subsystem 1910 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 1900 to send and/or receive messages to and/or from other devices using a network such as the Internet.

Various exemplary embodiments of the present smart transparency are now presented by way of illustration and not as an exhaustive list of all embodiments. An example includes a method performed by a head mounted display (HMD) device employed by a user occupying a physical environment, the HMD device supporting rendering of a mixed reality or virtual reality environment that includes holographic objects, comprising: placing a fade volume around the user, the fade volume having a near shell that is proximate to the user and a far shell that is distal to the user; determining a location of a holographic object with respect to the near and far shells by tracking the user's location within the mixed reality or virtual reality environment; and rendering the holographic object with transparency when it is located between the near and far shells, the transparency increasing as the object becomes closer to the near shell.

In another example, the method further includes rendering the holographic object with full opacity when the holographic object is located beyond the far shell of the fade volume. In another example, the method further includes rendering the holographic object with full transparency when the holographic object intersects the near shell of the fade volume. In another example, the method further includes performing the rendering of the holographic object using alpha compositing and interpolating an alpha value based on a transparency curve that is established over a spatial distance between the near and far shells of the fade volume or performing the rendering of the holographic object using ordered dithering. In another example, the transparency curve is a linear curve and the alpha value is interpolated on a linear basis. In another example, the method further includes performing the alpha compositing for the holographic object on a per-pixel basis. In another example, the method further includes performing head tracking to determine a proximity of the fade volume to the holographic object. In another example, the head tracking utilizes a sensor package in the HMD device for generating depth data. In another example, the method further includes generating the depth data using one or more depth-from-stereo imaging analyses or using a depth sensor. In another example, the method further includes using the sensor package to determine a current height of the user's head above the ground of the physical environment. In another example, the method further includes sizing the fade volume according to the height of the user's head. In another example, the method further includes configuring a radius of the far shell to be between one and one-half and two and one-half times a radius of the near shell. In another example, the method further includes configuring the radius of the near shell to be approximately one-half meter and the radius of the far shell to be approximately one meter. In another example, the method further includes performing the transparent rendering of the holographic object to show a background of the mixed or virtual reality environment, the background including one or more of virtual ground, real ground, other holographic objects, or real objects. In another example, the method further includes configuring the near and far shells using one of cylinder, sphere, capsule, or non-radial volume. In another example, the method further includes configuring the near and far shells as concentrically aligned cylinders having different radii or as spheres having different radii that share a common center.

A further example includes a head mounted display (HMD) device operable by a user in a physical environment, comprising: one or more processors; a display having areas onto which a mixed reality or virtual reality environment is rendered to the user; a sensor package; and one or more memory devices storing computer-readable instructions which, when executed by the one or more processors, perform a method comprising the steps of: performing head tracking of the user within the physical environment using the sensor package, maintaining a holographic geometry including one or more holographic objects having known locations within the mixed reality or virtual reality environment, responsively to the head tracking, determining the user's location with respect to the holographic geometry, and rendering portions of the holographic geometry with transparency based on the user's location so that the rendered portions increase in transparency as the distance between the user's location and rendered portions decreases.

In another example, the HMD device further includes determining a ratio of distances of the rendered portions with respective near and far shells of a fade volume that is placed around the user and controlling alpha blending depending on the ratio on a per-pixel basis.

Another example includes one or more computer readable memories storing computer-executable instructions for rendering a mixed reality or virtual reality environment within a variable field of view of a head mounted display (HMD) device operating in a real world environment, the method comprising the steps of: configuring display optics incorporated into the HMD device for selectively rendering a holographic object with varying degrees of opacity; dynamically determining a location of a holographic object with respect to each of a near and a far threshold using sensors incorporated into the HMD device; setting opacity for a rendered holographic object to a maximum value when the holographic object is located beyond the far threshold; and when the holographic object is located between the near threshold and the far threshold, based on the location, setting opacity for a rendered holographic object from a range spanning a minimum value and the maximum value.

In a further example, the opacity is increased using one of alpha compositing or dithering as the distance between the holographic object and the near threshold increases and further including enclosing the user within a fade volume having a near shell that is located at the near threshold and a far shell that is located at the far threshold, the near and far shells being selected from one of cylinder, sphere, capsule, or non-radial volume.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A method performed by a head mounted display (HMD) device employed by a user occupying a physical environment, the HMD device having one or more processors and supporting rendering of a virtual reality environment that includes virtual objects, comprising:

placing, using the one or more processors coupled to the HMD device, a fade volume that surrounds the user, the fade volume having a near shell that is proximate to the user and a far shell that is distal to the user, in which the near shell is positioned a radial distance from the user such that the near shell is distinct from the user;

determining, using the one or more processors and one or more sensors coupled to the HMD device, a location of a virtual object with respect to the near and far shells by tracking the user's location within the virtual reality environment; and rendering, using the one or more processors, the virtual object with transparency when it is located between the near and far shells, the transparency increasing as the virtual object becomes closer to the near shell, wherein the HMD device is configured to continuously render the virtual reality environment so that no part of the physical environment or the user is displayed on the HMD device.

2. The method of claim 1 further including rendering the virtual object with full opacity when the virtual object is located beyond the far shell of the fade volume.

3. The method of claim 1 further including rendering the virtual object with full transparency when the virtual object intersects the near shell of the fade volume.

4. The method of claim 1 further including performing the rendering of the virtual object using alpha compositing and interpolating an alpha value based on a transparency curve that is established over a spatial distance between the near and far shells of the fade volume or performing the rendering of the virtual object using ordered dithering.

5. The method of claim 4 in which the transparency curve is a linear curve and the alpha value is interpolated on a linear basis.

6. The method of claim 4 further including performing the alpha compositing for the virtual object on a per-pixel basis.

7. The method of claim 1 further including performing head tracking to determine a proximity of the fade volume to the virtual object.

8. The method of claim 7 in which the head tracking utilizes a sensor package in the HMD device for generating depth data.

9. The method of claim 8 further including generating the depth data using one or more depth-from-stereo imaging analyses or using a depth sensor.

10. The method of claim 8 further including using the sensor package to determine a current height of the user's head above the ground of the physical environment.

11. The method of claim 10 further including sizing the fade volume according to the height of the user's head.

12. The method of claim 1 further including configuring a radius of the far shell to be between one and one-half and two and one-half times a radius of the near shell.

13. The method of claim 12 further including configuring the radius of the near shell to be approximately one-half meter and the radius of the far shell to be approximately one meter.

14. The method of claim 1 further including performing the transparent rendering of the virtual object to show a background of the virtual reality environment, the background including one or more of virtual ground, or other virtual objects.

15. The method of claim 1 further including configuring the near and far shells using one of cylinder, sphere, capsule, or non-radial volume.

16. The method of claim 1 further including configuring the near and far shells as concentrically aligned cylinders having different radii or as spheres having different radii that share a common center.

* * * * *